United States Patent
Sinha et al.

(10) Patent No.: US 11,200,501 B2
(45) Date of Patent: Dec. 14, 2021

(54) ACCURATE AND INTERPRETABLE RULES FOR USER SEGMENTATION

(71) Applicant: Adobe Inc., San Jose, CA (US)

(72) Inventors: Ritwik Sinha, Bangalore (IN); Virgil-Artimon Palanciuc, Bucharest (RO); Pranav Ravindra Maneriker, Bangalore (IN); Manish Dash, Guwahati (IN); Tharun Mohandoss, West Bengal (IN); Dhruv Singal, Bangalore (IN)

(73) Assignee: ADOBE INC., San Jose, CA (US)

( * ) Notice: Subject to any disclaimer, the term of this patent is extended or adjusted under 35 U.S.C. 154(b) by 1022 days.

(21) Appl. No.: 15/837,929

(22) Filed: Dec. 11, 2017

(65) Prior Publication Data

US 2019/0180193 A1 Jun. 13, 2019

(51) Int. Cl.
| | |
|---|---|
| G06F 16/90 | (2019.01) |
| G06F 16/20 | (2019.01) |
| G06N 5/02 | (2006.01) |
| G06N 3/04 | (2006.01) |
| G06N 5/04 | (2006.01) |
| G06N 3/08 | (2006.01) |
| G06T 11/20 | (2006.01) |

(52) U.S. Cl.
CPC .......... *G06N 5/046* (2013.01); *G06N 3/04* (2013.01); *G06N 3/08* (2013.01); *G06T 11/206* (2013.01); *G06T 2200/24* (2013.01)

(58) Field of Classification Search
CPC .......... G06N 5/046; G06N 3/04; G06N 3/08; G06N 5/025; G06T 2200/24; G06T 11/206

USPC ........................................................ 706/1–62
See application file for complete search history.

(56) References Cited

U.S. PATENT DOCUMENTS

| | | | | |
|---|---|---|---|---|
| 8,126,911 B2 * | 2/2012 | Hu | ............... | G06F 16/2465 707/776 |
| 2007/0250522 A1 * | 10/2007 | Perrizo | ............... | G06N 20/00 |
| 2009/0171954 A1 * | 7/2009 | Liu | ............... | G06F 16/9027 |

(Continued)

OTHER PUBLICATIONS

Lakkaraju, H. (Aug. 13, 2016). Interpretable decision sets | Proceedings of the 22nd ACM SIGKDD International Conference on knowledge discovery and data mining. ACM Digital Library. https://dl.acm.org/doi/10.1145/2939672.2939874 (Year: 2016).*

(Continued)

*Primary Examiner* — Brandon S Cole
(74) *Attorney, Agent, or Firm* — Kilpatrick Townsend & Stockton LLP

(57) ABSTRACT

Various embodiments describe user segmentation. In an example, potential rules are generated by applying a frequency-based analysis to user interaction data points. Each of the potential rules includes a set of attributes of the user interaction data points and indicates that these data points belong to a segment of interest. An objective function is used to select an optimal set of rules from the potential rules for the segment of interest. The potential rules are used as variable inputs to the objective function and this function is optimized based on interpretability and accuracy parameters. Each rule from the optimal set is associated with a group of the segment of interest. The user interaction data points are segments into the groups by matching attributes of these data points with the rules.

19 Claims, 10 Drawing Sheets

(56) References Cited

U.S. PATENT DOCUMENTS

| | | | | |
|---|---|---|---|---|
| 2014/0156799 | A1* | 6/2014 | Zhang | H04L 67/02 709/218 |
| 2015/0006286 | A1* | 1/2015 | Liu | G06Q 30/0269 705/14.53 |
| 2016/0019587 | A1* | 1/2016 | Hueter | G06N 20/00 705/14.53 |
| 2017/0308791 | A1* | 10/2017 | Jiao | G06N 20/00 |
| 2017/0364819 | A1* | 12/2017 | Yang | H04L 41/0636 |
| 2019/0065343 | A1* | 2/2019 | Li | G06N 3/088 |

OTHER PUBLICATIONS

Narvekar, M. (Mar. 26, 2015). An optimized algorithm for association rule mining using FP tree. ScienceDirect.com | Science, health and medical journals, full text articles and books. https://www.sciencedirect.com/science/article/pii/S1877050915003336 (Year: 2015).*

Hong, T. (May 2008). Incrementally fast updated frequent pattern trees. ScienceDirect.com | Science, health and medical journals, full text articles and books. https://www.sciencedirect.com/science/article/pii/S0957417407001352 (Year: 2008).*

Ghorashi, S. (Jul. 2012). A frequent pattern mining algorithm for feature extraction of customer reviews. Semantic Scholar | AI-Powered Research Tool, https://www.semanticscholar.org/paper/A-frequent-pattern-mining-algorithm-for-feature-of-Ghorashi-Ibrahim/7aa1a79bd68b2eac7c879fe3780c9216e22f081f (Year: 2012).*

Silipo, R. (Sep. 2016). Customer segmentation comfortably from a web browser. KNIME, https://www.knime.com/blog/customer-segmentation-comfortably-from-a-web-browser (Year: 2016).*

IBM, "Watson Marketing Engage and Understand Your Customer at Scale, Wherever They Are", https://www.ibm.com/think/marketing/a-marketers-guide-to-customer-segmentation /, May 2018, accessed Jun. 14, 2019, 6 pages.

Salesforce, "Email Marketing Software Customized Solutions", https://www.marketingcloud.com/products/audiences/audience-segmentation/, 2018. Accessed Jun. 14, 2019, 10 pages.

Chegg, "Saving Broke Students One Textbook at a Time", first accessed Apr. 27, 2017 and Jun. 14, 2019, 4 pages.

Cheng, Hong et al. "Discriminative Frequent Pattern Analysis For Effective Classification," in Data Engineering, 2007, ICDE 2007 IEEE 23rd International Conference, IEEE, 2007, 10 pages.

Zhang, Weinan, et al., "Deep Learning Over Multi-Field Categorical Data," European conference on information retrieval, Springer 2016, 13 pages.

Lakkaraju, Himabindu, et al., "Interpretable Decision Sets: A Joint Framework for Description and Prediction," in Proceedings of the 22nd ACM SIGKDD International Conference on Knowledge Discovery and Data Mining, ACM, 2016, 10 pages.

Ribiero, Marco Tulio, et al., "Why Should I Trust You?: Explaining The Predictions of Any Classifier", Proceedings of the 22nd ACM SIGKDD International Conference on Knowledge Discovery and Data Mining, ACM, 2016 10 pages.

Buchbinder, Niv, et al., "A Tight Linear Time (1/2)-Approximation For Unconstrained Submodular Maximization," SIAM Journal on Computing, vol. 44, No. 5, 2015, 10 pages.

Agrawal, Rakesh, et al., "Mining Association Rules Between Sets of Items in Large Databases," in Proceedings of the 1993 ACM SIGMOD International Conference on Management of Data, SIGMOD '93, (New York, NY, USA), ACM, 1993, 10 pages.

Zaki, M. J., et al., "New Algorithms For Fast Discovery of Association Rules.," in KDD, vol. 97, 1997, 4 pages.

Han, Jiawe, et al., "Mining Frequent Patterns Without Candidate Generation", in Proceedings of the 2000 ACM SIGMOD International Conference on Management of Data, SIGMOD '00, (New York, NY, USA), ACM, 2000, 12 pages.

Feige, Uriel, et al., "Maximizing Non-Monotone Submodular Functions", SIAM Journal on Computing, vol. 40, No. 4, 2011, 18 pages.

"IBM on Mitigating Bias in ML", https://www.ibm.com/blogs/research/2018/02/mitigating-bias-ai-models.

"Microsoft Research on Intelligible, Interpretable, and Transparent Machine Learning", https://www.microsoft.com/en-us/research/project/intelligible-interpretable-and-transparent-machine-learning.

Bergstra et al., "Algorithms for Hyper-Parameter Optimization", Advances in Neural Information Processing Systems, Available online at: https://papers.nips.cc/paper/4443-algorithms-for-hyper-parameter-optimization.pdf, Dec. 12-15, 2011, pp. 1-9.

Bergstra et al., "Hyperopt: A Python Library for Optimizing the Hyperparameters of Machine Learning Algorithms", Proc. of the 12th Python in Science Conf., Available online at: https://conference.scipy.org/proceedings/scipy2013/pdfs/bergstra_hyperopt.pdf, Jan. 2013, pp. 13-20.

Bertsimas et al., "Ordered Rules for Classification: A Discrete Optimization Approach to Associative Classification", Operations Research Center, Available online at: https://dspace.mit.edu/bitstream/handle/1721.1/73166/OR386-11.pdf?sequence=4, 2012, pp. 1-31.

Borgelt, "An Implementation of the FP-Growth Algorithm", In Proceedings of the 1st International Workshop on Open Source Data Mining: Frequent Pattern Mining Implementations, ACM, Available online at: http://www.borgelt.net/papers/fpgrowth.pdf, Aug. 21, 2005, pp. 1-5.

Borgelt, "Frequent Item Set Mining", Wiley Interdisciplinary Reviews: Data Mining and Knowledge Discovery, vol. 2, No. 6, Nov.-Dec. 2012, pp. 437-456.

Breiman et al., "Classification and Regression Trees", Chapman & Hall/CRC, 2017, 31 pages.

Breiman, "Random Forests", Machine Learning, vol. 45, No. 1, Jan. 2001, pp. 5-32.

Buchbinder et al., "A Tight Linear Time (1/2)-Approximation for Unconstrained Submodular Maximization", Society for Industrial and Applied Mathematics, vol. 44, No. 5, Oct. 27, 2015, pp. 1384-1402.

Buchbinder et al., "A Tight Linear Time (1/2)-Approximation for Unconstrained Submodular Maximization", IEEE 53rd Annual Symposium on Foundations of Computer Science, 2012, pp. 649-658.

Clark et al., "The CN2 Induction Algorithm", Machine Learning, vol. 3, No. 4, Available online at: https://rd.springer.com/content/pdf/10.1023%2FA%3A1022641700528.pdf, 1989, pp. 261-283.

Dheeru et al., "UCI Machine Learning Repository", Available online at: http://archive.ics.uci.edu/ml/index.php, Accessed from Internet at Mar. 22, 2019, 2 pages.

Doshi-Velez et al., "Towards a Rigorous Science of Interpretable Machine Learning", Available online at: https://arxiv.org/pdf/1702.08608.pdf, Mar. 2, 2017, pp. 1-13.

Eggensperger et al., "Towards an Empirical Foundation for Assessing Bayesian Optimization of Hyperparameters", In NIPS workshop on Bayesian Optimization in Theory and Practice, vol. 10, No. 3, Available online at: https://ml.infomiatik.uni-freiburg.de/papers/13-BayesOpt_EmpiricalFoundation.pdf, 2013, pp. 1-5.

Feige et al., "Maximizing Non-Monotone Submodular Functions", Proceeding FOCS '07 Proceedings of the 48th Annual IEEE Symposium on Foundations of Computer Science, Apr. 19, 2007, pp. 1-17.

Friedman, "Greedy Function Approximation: A Gradient Boosting Machine", The Annals of Statistics, vol. 29, No. 5, Oct. 2001, pp. 1189-1232.

Friedman, "Stochastic Gradient Boosting", Computational Statistics & Data Analysis, vol. 38, No. 4, Mar. 26, 1999, 10 pages.

Guidotti et al., "A Survey of Methods for Explaining Black Box Models", ACM Computing Surveys, vol. 51, No. 5, Available online at: https://arxiv.org/pdf/1802.01933.pdf, Jun. 21, 2018, 45 pages.

Guidotti et al., "Local Rule-Based Explanations of Black Box Decision Systems", Available online at: https://arxiv.org/pdf/1805.10820.pdf, May 28, 2018, 10 pages.

Hofman et al., "Prediction and Explanation in Social Systems", Science, vol. 355, No. 6324, Available online at: http://science.sciencemag.org/content/sci/355/6324/486.full.pdf, Feb. 3, 2017, pp. 486-488.

Hosmer et al., "Applied Logistic Regression", 2nd Edition, John Wiley & Sons, vol. 398, 2013, 18 pages.

(56) References Cited

OTHER PUBLICATIONS

Koh et al., "Understanding Black-Box Predictions via Influence Functions", In ICML, Available online at: https://arxiv.org/pdf/1703.04730.pdf, Jul. 10, 2017, 11 pages.

Lakkaraju, "Interpretable & Explorable Approximations of Black Box Models", KDD'17, Available online at: https://arxiv.org/pdf/1707.01154.pdf, Jul. 4, 2017, 5 pages.

Lakkaraju, "Interpretable Decision Sets", GitHub, Available online at: https://github.com/lvhimabindu/interpretable_decision_sets, Accessed from Internet at Mar. 22, 2019, 1 page.

Letham et al., "Interpretable Classifiers using Rules and Bayesian Analysis: Building a Better Stroke Prediction Model", The Annals of Applied Statistics, vol. 9, No. 3, Available online at: https://arxiv.org/pdf/1511.01644.pdf, Nov. 5, 2015, 23 pages.

Liu et al., "Integrating Classification and Association Rule Mining", Proceeding KDD'98 Proceedings of the Fourth International Conference on Knowledge Discovery and Data Mining, Available online at: http://alpha.luc.ac.be/~brijs/pubs/cba2003a.pdf, Aug. 27-31, 1998, pp. 80-86.

O'Neil et al., "Weapons of Math Destruction: How Big Data Increases Inequality and Threatens Democracy", Broadway Books, 2016, 204 pages.

Pedregosa et al., "Scikit-Learn: Machine Learning In Python", Journal of Machine Learning Research, vol. 12, Oct. 2011, pp. 2825-2830.

Quinlan, "C4.5: Programs for Machine Learning", Elsevier, 2014.

Ribeiro et al., "Anchors: High-precision Model-Agnostic Explanations", In AAAI Conference on Artificial Intelligence, Available online at: https://homes.cs.washington.edu/~marcotcr/aaai18.pdf, 2018, 9 pages.

Ribeiro et al., "Nothing Else Matters: Model-Agnostic Explanations by Identifying Prediction Invariance", 30th Conference on Neural Information Processing Systems, NIPS, Available online at: https://arxiv.org/pdf/1611.05817.pdf, Nov. 17, 2016, 5 pages.

Rivest et al., "Learning Decision Lists", Machine Learning, vol. 2, No. 3, Available online at: https://people.csail.mit.edu/rivest/pubs/Riv87b.pdf, Nov. 1987, pp. 229-246.

Russakovsky et al., "ImageNet Large Scale Visual Recognition Challenge", International Journal of Computer Vision, vol. 115, No. 3, Jan. 30, 2015, pp. 211-252.

Selvaraju et al., "Grad-CAM: Visual Explanations from Deep Networks via Gradient-Based Localization", In ICCV, Available online at: https://arxiv.org/pdf/1610.02391.pdf, Mar. 21, 2017, pp. 618-626.

Shmueli, "To Explain or to Predict?", Statistical Science, vol. 25, No. 3, Available online at: https://www.stat.berkeley.edu/~aldous/157/Papers/shmueli.pdf, 2010, pp. 289-310.

Sinha et al., "Forecasting Granular Audience Size for Online Advertising", In Proceedings of the ADKDD'18, ACM, Available online at: https://arxiv.org/pdf/1901.02412.pdf, 2018, 6 pages.

Vellido et al., "Making Machine Learning Models Interpretable", In ESANN, vol. 12, Citeseer, Available online at: https://www.elen.ucl.ac.be/Proceedings/esann/esannpdf/es2012-7.pdf, Apr. 25-27, 2012, pp. 163-172.

Zaki et al., "New Algorithms for Fast Discovery of Association Rules", KDD-97 Proceedings, Computer Science Department, 1997, pp. 283-286.

Zhang et al., "Deep Learning Over Multi-Field Categorical Data—A Case Study on User Response Prediction", Springer International Publishing Switzerland, 2016, pp. 45-57.

Zhang et al., "Interpretable Convolutional Neural Networks", vol. 2, No. 3, Available online at: https://arxiv.org/pdf/1710.00935.pdf, 2017, 14 pages.

Zhang et al., "Understanding Deep Learning Requires Rethinking Generalization", Available online at: https://arxiv.org/pdf/1611.03530.pdf, 2016, 15 pages.

Zhang et al., "Visual Interpretability for Deep Learning: A Survey", Frontiers of Information Technology & Electronic Engineering, vol. 19, No. 1, Available online at: https://arxiv.org/pdf/1802.00614.pdf, Feb. 7, 2018, pp. 27-39.

Amershi et al., "ModelTracker: Redesigning Performance Analysis Tools for Machine Learning", Proceedings of the 33rd Annual ACM Conference on Human Factors in Computing Systems, Available online at https://dl.acm.org/citation.cfm?doid=2702123.2702509, Apr. 18-23, 2015, pp. 337-346.

* cited by examiner

ACCURATE AND INTERPRETABLE RULES FOR USER SEGMENTATION

TECHNICAL FIELD

The application generally relates to user segmentation. In an example, accurate and interpretable rules are generated in a computational efficient manner and are used to perform the user segmentation.

BACKGROUND

Many different computing systems rely on user segmentation to provide computing services to end users. For example, a content management system sends targeted content to an end user device depending on the user segment associated with that device. The user segmentation is typically generated based on interaction data of the end user device within a computer network. The quality of the provided computing services (e.g., of the targeted content) depends on the accuracy of the user segmentation. The more accurate the user segmentation, the higher the quality of the computing services becomes.

Generally, two approaches have been adopted in the industry for user segmentation: a priori segmentation and a posteriori segmentation. Under the a priori approach, an operator of a computing system (e.g., a service provider of the content management system) defines the user segment. From that point on, a computing model is used to determine whether the end user computing device belongs to the user segment or not based on the interaction data. However, this approach can be inaccurate because it mainly depends on how well the user segment is defined, which, in turn, relies on prior knowledge of the operator about the potential interactions of end user devices within the computer network.

Under the a posteriori approach, the accuracy is much improved, thereby enhancing the quality of the computing services. The accuracy improvements is one of the reasons for a trend in the industry towards using the a posteriori approach.

Generally, the a posteriori approach relies on a predictive model that, on its own, predicts the user segments and identifies the particular user segment that should be associated with the end user device. Under this approach, the operator need not define the user segments.

Various predictive models are possible, including machine learning models, deep learning systems, regression models, and decision trees. Some of these predictive models (e.g., learning models, deep learning systems, regression models) can have better accuracy than other ones (e.g., decision trees). However, the accuracy comes at the cost of interpretability. The more accurate the user segmentation, the less readable a user segment becomes. The interpretability indicates how well an operator can read and understand the user segment and the reasons certain end user devices are associated with the user segment.

For example, a deep learning system can generate user segments with relatively high accuracy through feature extractions within hidden layers of its neural network. It is possible to output these features to the operator, but they are not in a user-friendly format that could be understood by any operator. Instead, the features would appear as numerical strings without any meaningful information. Hence, the operator would not understand the relevant data that leads the deep learning system to associate the end user device with a particular user segment (e.g., that the type of web browser, operating system, and location of the end user device bias the deep learning system to output the particular user segmentation).

In turn, the lack or decrease to the interpretability can negatively affect the quality of the computing services. Specifically, the operator may not be able to properly configure the computing system without knowledge about the relevant data that results in a particular user segmentation. For instance, and referring back to the content management system and deep learning system examples above, the operator can understand that the end user device belongs to a particular user segment but does not know that the type of web browser, operating system, and location are important aspects that result in the particular user segmentation. Hence, the operator is not able to use these three aspects as controls for the content management system to select and send relevant content (e.g., to do so anytime the interaction data of an end user device includes the three aspects). Accordingly, despite the increase in the accuracy, the a posteriori approach can suffer from interpretability issues, which can in turn decrease the quality of the computing services.

Further, the computational efficiency of using the above approaches can be challenging given the amount of interaction data that should be analyzed across the user devices. This amount can be well in the terabyte range. In this case, some of the above approaches can consume a large amount of processing power, memory, and running time. If not enough processing power and memory are available, the implemented approach likely fails. Running time can limit the use of the implemented approach (e.g., the longer the running time, the less useful the approach becomes).

SUMMARY

Embodiments of the present disclosure are directed to, among other things, a predictive model that accurately performs user segmentation in a computationally efficient manner and that provides interpretable insights to an operator about the relevant data that influences the user segmentation. In an example, a computer system receives user interaction data points. Each user interaction data point includes at least one attribute of a user interaction within a computer network and a segment indicator of whether the user interaction belongs to a segment of interest. The computer system generates rules based on frequencies of occurrence of attributes of user interactions in the user interaction data points and based on segment indicators associated with the user interactions. Each rule includes a different set of the attributes and indicates that the different set of the attributes is associated with the segment of interest. The computer system selects a set of rules from the rules based on an objective function. Selecting the set of rules includes using the rules as variables of the objective function and optimizing the objective function for the segment of interest based on interpretability parameters and accuracy parameters. The computer system segments the user interaction data points into groups of the segment of interest based on the set of rules. Each group is associated with a rule from the set of rules. A user interaction data point comprising a set of attributes is added to a group based on a match between the set of attributes and the rule associated with the group. The computer system presents the groups on a user interface. A presentation of each group presents the rule associated with the group.

These illustrative examples are mentioned not to limit or define the disclosure, but to provide examples to aid understanding thereof. Additional embodiments and examples are discussed in the Detailed Description, and further description is provided there.

DETAILED DESCRIPTION

Figure 1:
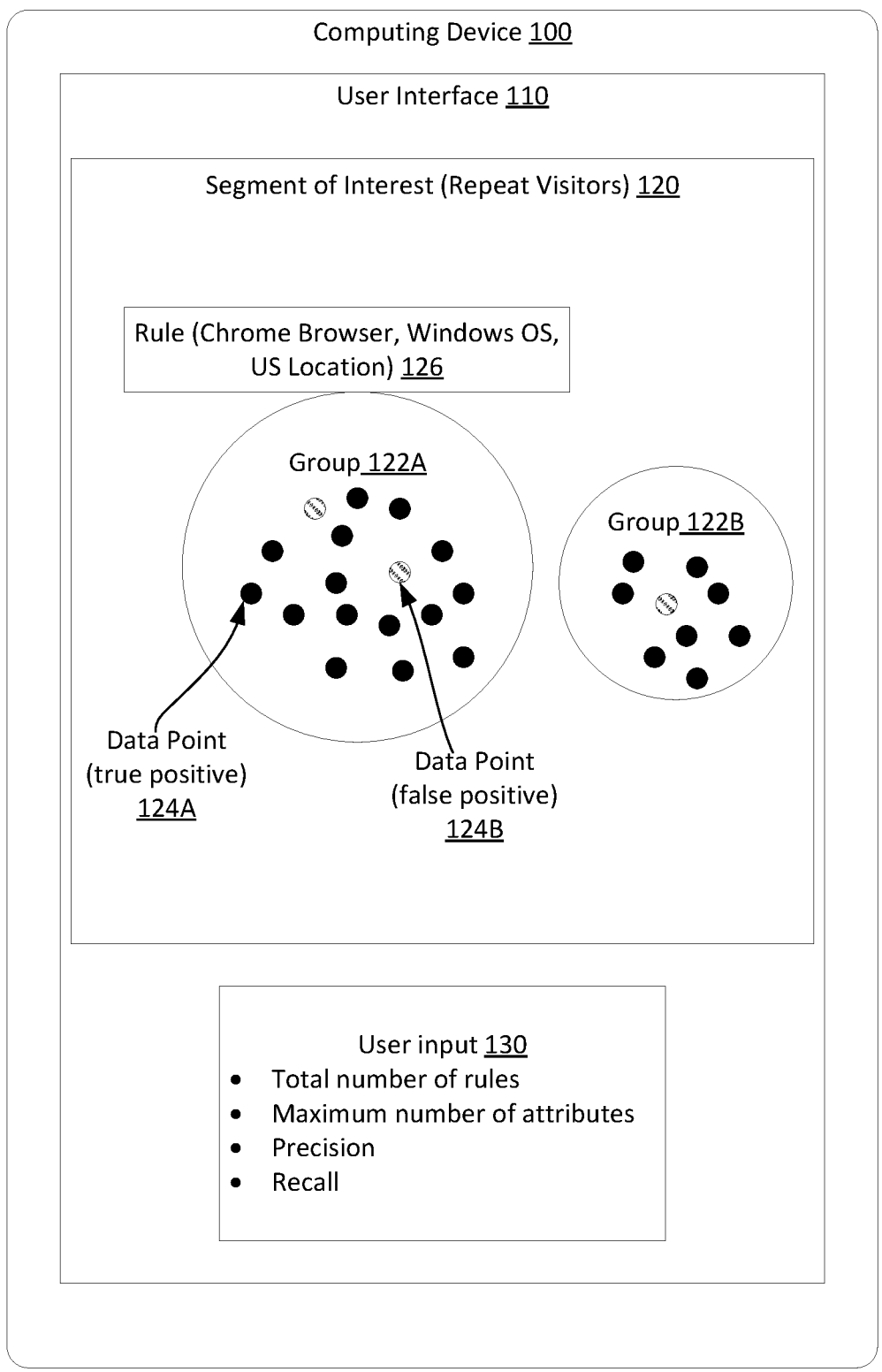
FIG. 1 illustrates an example of a user interface that presents groups of data points, where the groups belong to a segment of interest, according to embodiments of the present disclosure.

Embodiments of the present disclosure are directed to, among other things, a predictive model that accurately performs user segmentation in a computationally efficient manner and that provides interpretable insights to an operator about the relevant data that influences the user segmentation. The embodiments are also directed to using this predictive model to improve the quality of computing services that rely on the user segmentation.

In an example, user interaction data points are received. Each of the data points includes attributes of a user interaction within a computer network and a segment indicator of whether the user interaction belongs to a segment of interest. The user interaction can be an interaction from an end user device with a computing service hosted on the computer network (e.g., an access to a web page). The attributes can characterize aspects of the user interaction (e.g., the end user device's browser is Chrome, the operating system (OS) is Windows, the device location is California). The segment indicator can be a binary indicator of whether the user interaction falls under the segment of interest or not (e.g., whether the web page access is for a "repeat visitor"—where the segment of interest is "repeat visitors").

Rules are extracted from the user interaction data points. Each rule includes a different set of the attributes and indicates that this set is associated with the segment of interest. For example, frequency-based analysis is applied to the user interaction data points. Attributes that tend to occur together and that are found in user interactions belonging to the segment of interest are organized into the different sets that form the rules. For instance, if the frequency-based analysis indicates that Chrome browser, Windows OS, and California location co-occur in the user interactions belonging to "repeat visitors" at a frequency that exceeds a threshold, a rule is generated and indicates that the combination of the three attributes is associated with the segment of interest. This rule can be expressed as (Chrome browser, Windows OS, and California→repeat visitors).

Thereafter, an optimal set of rules is selected from the extracted rules. This optimal set allows an accurate and computationally efficient user segmentation while also being presentable at a user interface in an interpretable manner such that an operator can understand the user segmentation. In an example, an objective function is used to select the optimal set of rules. The rules are input to the objective function as variables. And the objective function is optimized for the segment of interest based on interpretability parameters and accuracy parameters. The optimization looks to increase (e.g., maximize) the interpretability and accuracy. Various interpretability parameters can be defined including the size of the optimal set (e.g., the total number of selected rules), the length of each selected rule (e.g., the total number of attributes each selected rule contains), and overlap between the selected rules (e.g., the number of user interaction data points that are covered by multiple selected rules). The interpretability is increased by selecting specific rules from the variables such that the size of the optimal set is small, the selected rules have a small length, and the overlap is reduced (e.g., minimized). Various accuracy parameters are also possible including a false positive rate (e.g., the total number of incorrect user interaction data points that would be covered by the selected rules) and a true positive rate (e.g., the total number of correct user interaction data points that would be covered by the selected rules). The accuracy is increased by selecting specific rules from the variables such that the size of the false positive rate is decreased (e.g., minimized) and the true positive rate is increased (e.g., maximized).

The optimal set of rules is used for segmenting the user interaction data points into groups of the segment of interest. Each group is associated with one of the rules from the optimal set. A user interaction data point is added to a group if the attributes of the user interaction data points match the attributes specified in the rule (e.g., the rule covers the interaction data point). For example, the rule (Chrome browser, Windows OS, and California→repeat visitors) is included in the optimal set and a group is initiated for that rule. This group can be considered as a sub-segment of the segment of interest. Any user interaction data point that indicates a user interaction from an end user device using a Chrome browser and Windows OS and located in California is added to the group.

The groups are presented on an interface accessible to the operator. The presentation of each group presents the user interaction data points that are included in the group and presents the rule associated with that group. For example, by pointing a cursor over the above group, the rule of (Chrome browser, Windows OS, and California→repeat visitors) is presented as a label of the group. In this way, the operator can easily understand that these three attributes resulted in the segmentation of the user interaction data points in the user segment. In other words, the operator can easily interpret the user segmentation.

Accordingly, if the user segmentation is used to control a computing system, the relevant attributes associated with a group through the group's rule can be used as control parameters in the set-up of the computing system. For instance, within the context of a content management system, this system can be configured such that any time the Chrome browser, Windows OS, and California co-occur together in a user interaction (e.g., access to a web page), that user interaction is automatically associated with the particular group, and targeted content to which the group has high affinity can be immediately used in the user interaction (e.g., inserted in real-time in a space of the web page, where real-time is relative to the end user device's access to the web page).

Embodiments of the present disclosure provide many technical advantages over the user segmentation approaches of the existing systems. The user segmentation is as accurate as if not better than the a posteriori approaches, while also being far more interpretable and computationally efficient to perform. In turn, the increase in the interpretability while at least maintaining the high accuracy level increases the quality of the computing services that rely on the user segmentation. In experiments and as further described in connection with the next figures, the precision (e.g., how many segmented data points are relevant) and recall (how many relevant data points are segmented) are as good as those of a decision tree, factorization machine-based neural network, and logistic regression, while the interpretability is much higher (the one for the decision tree may be moderate, while completely absent for the factorization machine-based neural network and logistic regression). Further, the running time is magnitudes smaller than that of these other approaches (e.g., less than 50 seconds, compared to over 200 seconds for the decision tree and over 1,000 seconds for the factorization machine-based neural network, and logistic regression). The much shorter running time indicates that the computation is much more efficient in terms of processing power and memory usages.

As used herein, a "user interaction data point" represents a data point about a user interaction. This data point can be defined, at least in part, in terms of the attributes of the user interaction. A "user interaction" represents an interaction between an end user device and a computing resource within a computer network. Access to a web site, a click on a link presented on a web page, moving away from the web site to another web site are examples of user interactions. An "attribute" of a user interaction represents a property that is inherent to the user interaction. In an example, the property can be a behavioral, demographical, and or geographical property of a user behind the user interaction, a user device operated to provide the user interaction, or an aspect of the user interaction itself. Browser type, OS type, device type, interaction type (e.g., access to a web site, click on a link, etc.), device location, user location, user gender, user age, and user preference are examples of attributes.

As used herein, a "segment indicator" is an indicator associated with a segment and that identifies whether a user interaction (or a user or an end user device behind the user interaction) belongs to the segment. In an example, the segment indicator can be a binary indicator (e.g., that takes a value of "1" or "0"). A "segment" represents a cluster of data points, where these data points are added to the cluster because of a common set of attributes that are shared between them. For example, the segment of "repeat visitors" represent a cluster of users that have a tendency to visit a web site at a recurring basis (the common set of attributes is the repeated visits). The segment indicator for the "repeat visitors" indicates whether a user has that tendency or not and can be inferred from the user interaction(s) provided from one or more end user devices of the user.

As used herein, a "rule" represents a set of attributes and a segment indicator. The attributes occur together in a set of data points at a frequency that exceeds a threshold and are for user interactions indicating that these interactions (or the related users or end user devices) belong to the segment. For example, the rule of (Chrome browser, Windows OS, and California→repeat visitors) indicates that a user interaction provided from an end user device using a Chrome browser and a Windows OS and being located in California belongs to the "repeat visitors" segments. Generally, a rule is associated with a group of the segment and can be used to classify data points as belonging to the group.

As used herein, a "group" of a segment represents a sub-segment of the segment. Generally, data points in the group share a large number of common attributes between them. These data points are added to the group by matching the common attributes to the rule of the group. For example, the group of "Chrome, Windows, California" users is a sub-segment of the "repeat visitors" segment and data points in this group corresponds to user interactions provided from user devices that use Chrome browsers and Windows OS and that are located in California.

As used herein, an "objective function" represents a function that is defined to resolve an optimization problem. The objective function allows to find the best or most optimal set of rules that can maximize interpretability parameters and accuracy parameters. "Interpretability" represents how well a human operator can read and understand a rule used to segment data points in a group. Different interpretability parameters are possible to define, including the length of the rule, the size of the optimal set of the rules, and overlap between the selected rules. "Accuracy" refers to how well the optimal set of the rules segments data points in the different groups. Various accuracy parameters are possible to define including a false positive rate (also referred to as fallout in the industry) and a true positive rate (also referred to as recall in the industry).

FIG. 1 illustrates an example of a user interface that presents groups of data points, where the groups belong to a segment of interest, according to embodiments of the present disclosure. In an example, a computing device 100 hosts a user segmentation application or interfaces with one hosted on a remote computing resource (e.g., on a cloud computing system). Outputs of the user segmentation application are presented on a user interface 110 of the computing device 100, such as on a graphical user interface presented on a display of the computing device 100. The output identifies a segment of interest 120 (illustrated as "repeat visitors"), groups 122 that form the segment of interest 120, the data points 124 segmented in each of the groups 122, and the rule 126 used for each group to perform the segmentation of the relevant data points into that group.

The segment of interest 124 can be a segment that an operator of the computing device 100 is interested to learn more about, such as how data points 124 can be segmented within the segment of interest 120. The data points 124 represent user interaction data points corresponding to, for example, user interactions with one or more web sites. Each of the data points 124 includes the attributes of a corresponding user interaction (e.g., an access to a web site, a click on a link of a web page, or a surfing away) and includes or is labeled with whether the corresponding interaction belongs to the user segment or not (does the user interaction indicate that the web site's visitor is a repeat visitor or not). In FIG. 1, data points 124 having a segment indicator of "1"

(e.g., the visitor is a repeat visitor) are shown as solid circles. Data points having a segment indicator of "0" (e.g., the visitor is not a repeat visitor) are shown as shaded circles.

As illustrated, a group 122A and a group 122B are presented on the user interface 120. Of course, a different number of groups can be presented depending on the segmentation and/or user preferences. As presented, each of the groups 122A and 122B is shown to include the data points 124 that were segmented into that group 122A or 122B. In an example, the presentation 124 of a data point within a group 122 is set according to the segment indicator of that data point 124. In other words, the format of the presentation (e.g., such as the coloring, the shape, and/or the size, etc.) of the data point 124 is set to indicate whether that data point 124 correctly belongs to the segment of interest 120 or not. Hence, it would be easy for the operator to get a quick visual of segmentation errors. For instance, data point 124A presented in group 122A has a segment indicator of "1" and, thus, was properly segmented (e.g., it is a true positive). In comparison, data point 124B also presented in group 122A has a segment indicator of "0" and, thus, was improperly segmented (e.g., it is a false positive). By coloring these two data points differently (e.g., solid circle for the true positive data point 124A and a shaded circle for the false positive data point 124B), the errors in the segmentation are easily visualized.

When a user selects or hovers over group 122A, the rule 126 of that group 122A is also presented. The same would similarly be presented for group 122B. Of course other types of presentations are possible (e.g., the rules 126 can always be displayed as a default and can be made hidden upon a user request, or the user click causes an audible presentation of the relevant rule).

The presentation of a rule 126 of a group 122 shows at least the attributes that are defined by the rule and that were used to segment the relevant data points 124 into that group 122. For example, the rule 126 presented for the group 122A shows that all the data points 124A within the group 122A correspond to user interactions that share the three attributes of Chrome browser, Windows OS, and US device location.

In addition, the user interface 110 allows the operator of the computing device 100 to provide user input 130 that affect the definition of the rules 126 and, thus, the segmentation of the data points 124 into groups 122 based on these rules 126. In an example, the user input 130 specifies the total number of rules 126 that should be used to generate the groups 122 (and, if each rule corresponds to one group, this input specifies the total number of groups), the maximum number of attributes within any of such rules 126, the precision of the segmentation, and/or the recall of the segmentation. Based on the user input 130, the user segmentation application performs the segmentation and presents the output on the user interface 110.

Hence, such presentation of the user segmentation provides many technical advantages over the existing systems. In one example, the human operator can easily interpret the rules 126 that resulted in segmenting the data points 124 into the groups 122. In comparison, the existing systems may not be capable of presenting such interpretable rules. For instance, if a neural network is used, any presented rule would include the features relevant to the neural network but that the human operator would not be able to make sense of. In particular, instead of interpretable attributes under each rule, the human operator would simply be looking at numerical values that make no sense to him or her. In another example, the user input 130 allows the human operator to change parameters of the user segmentation and to see how the parameters or the changes thereto impact the segmentation based on the visual presentation on the user interface 120.

Figure 2:
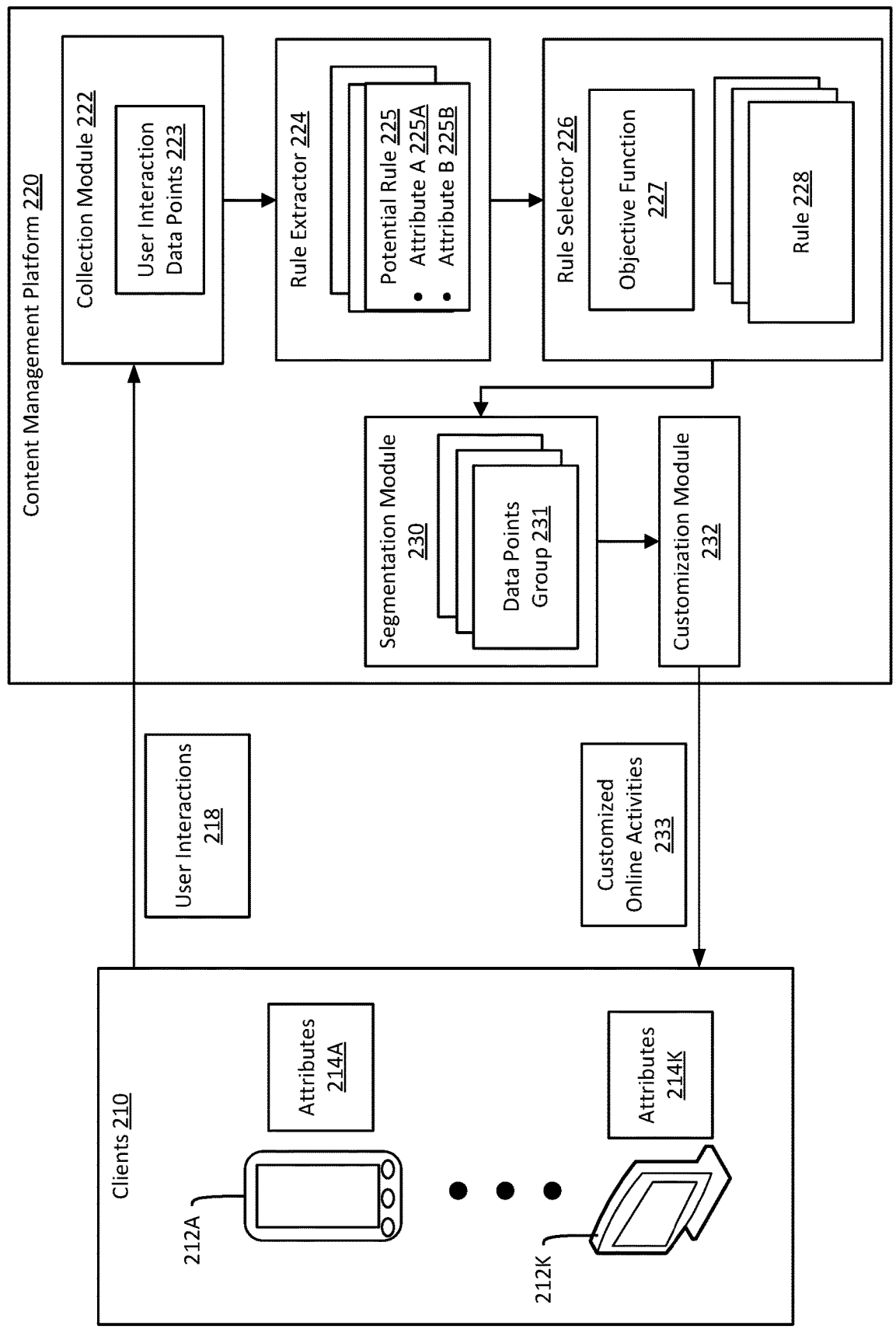
FIG. 2 is a diagram depicting an example of a computing environment for user segmentation and for providing a customized computing service according to certain embodiments.

FIG. 2 is a diagram depicting an example of a computing environment for user segmentation and for providing a customized computing service according to certain embodiments. In an embodiment, the computing environment includes a number of clients 210 and a content management platform 220. The content management platform 220 generates segments of user interaction data points into groups of a segment of interest. The groups are used to customize online activities of the clients 210.

In an example, each of the clients 210 represents an end user computing device 212 to access various online services, such as accessing social media platforms, browsing web sites, streaming media, exchanging documents, conducting electronic transactions, and other types of online services. Access to an online service represents an online activity and is an example of a user interaction 218. Different types of computing devices 212-212K are possible including, for example, personal computing devices such as a smartphone, a desktop computer, a laptop, or a tablet and, in another example, more sophisticated devices such as a server, a cluster of servers, or a virtual computing resource like a virtual machine or a collection of virtual machines.

As illustrated in FIG. 2, each of the computing devices 212A-212K is associated with a number of attributes 214A-214K. For instance, the computing device 212A is a tablet having attributes 214A (e.g., device type: tablet, OS: Windows, browser: Chrome, IP address location: US, Cookie, IP address, etc.). Similarly, the computing device 212K is a desktop computer also having a number of attributes 214K. The user interactions 218 (e.g., the online activities of the computing devices 212A-212K) can be associated with some or all of these attributes 214A-214K.

In an example, the content management platform 220 represents a computing platform that implements computing modules to perform user segmentation and customize the online activities of the users (e.g., by providing targeted content based on the user segmentation). The configuration and operations of such modules are further described in connection with the next figures. In an example, the modules that perform the user segmentation represent a user segmentation application (e.g., such as the one described in connection with FIG. 1) and includes a rule extractor 224, a rule selector 226, and a segmentation module 230. A collection module 222 can be separately hosted on the content management platform 220 and is configured to collect data associated with the user interaction 218. This data can include the attributes 214A-214K. A customization module 232 can be separately hosted on the content management platform 220 and is configured to customize the online activities.

Generally, the collection module 222 collects data points 223 about the user interactions 218 (e.g., the online activities) of the computing device 212A-212K. Each data point 223 corresponds to a user interaction 218 and includes attributes of that user interaction 218 and a segment indicator related to a segment of interest. The rule extractor 224 extracts potential rules 225 by applying a frequency-based analysis to the data points 223. Each of the potential rules 225 includes a set of the attributes 214A-214K (e.g., shown in FIG. 2 as attribute A 225A and attribute B 225B under a potential rule 225) based on the analysis. The rule selector 226 uses an objective function 227 to select rules 228 from the potential rules 225. The selected rules 228 represent an optimal set of rules that can be used to accurately perform the user segmentation and that can be presented in an easily interpretable format to a human operator. The segmentation module 230 uses the rules 228 to segment the user interaction data points 223 into groups 231. Generally, each group 231 is associated with one or more rules 228. Each of such rules specifies a set of attributes. Data points are added to a group by matching the attributes of these data points with at least one set of attributes from the rule(s) of the group, or alternatively, with a union of all of the sets of attributes from the rules of the group. Further, the segmentation module 230 provides the groups 231 and the associated rules 228 to an operator device for presentation on a user interface. The customization module 232 facilitates various computing services for a computing device 212 based on the particular group 231 that contains the user interaction data points 223 of that computing device 212. For example, each of the groups 231 is associated with particular targeted content. The targeted content for the particular group 231 is then provided to the computing device 212, thereby customizing the online activities 233 of the computing device 212.

Figure 3:
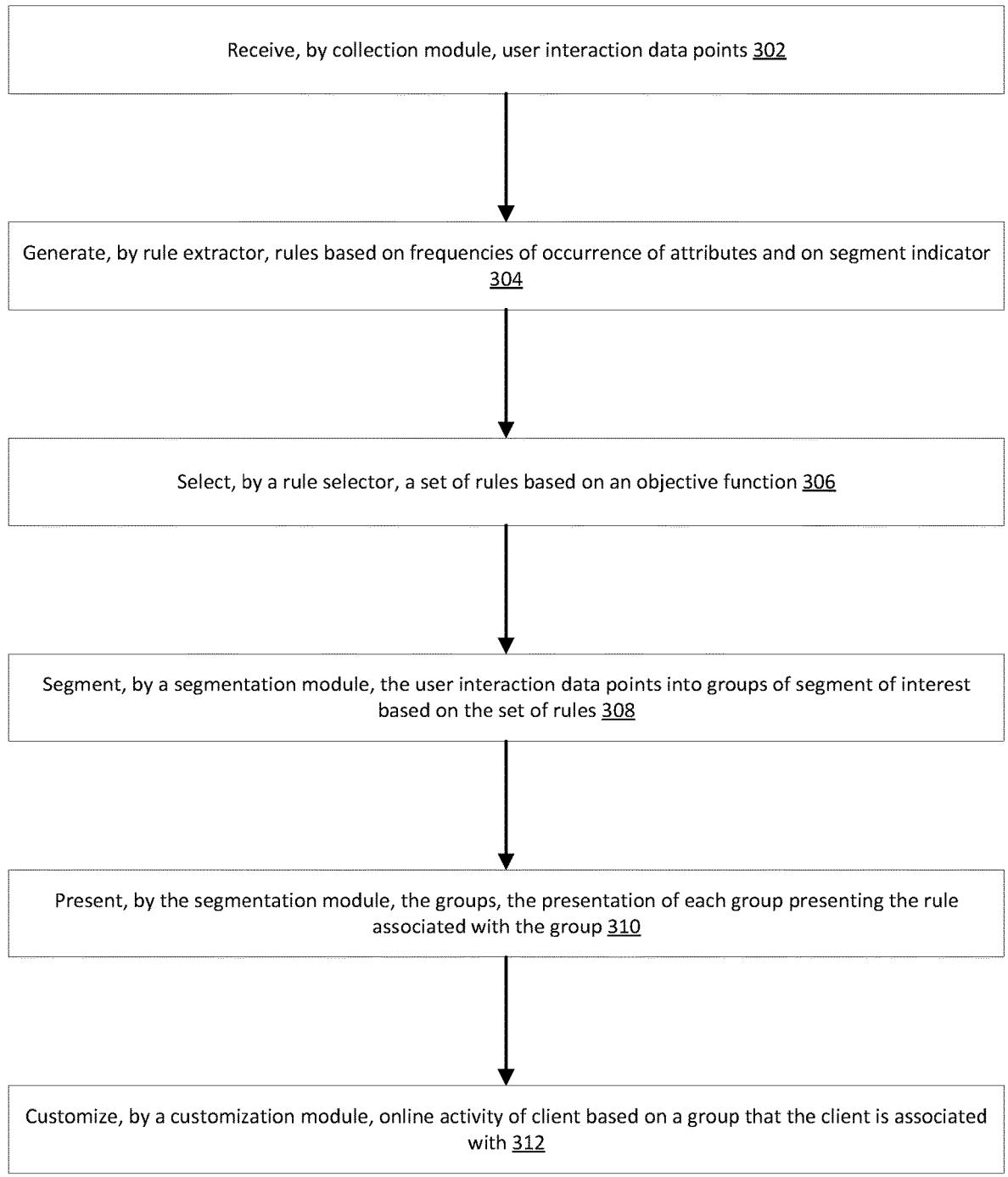
FIG. 3 illustrates an example of a flow for user segmentation and for providing a customized computing service according to certain embodiments.

FIG. 3 illustrates an example of a flow for user segmentation and for providing a customized computing service according to certain embodiments. A computer system hosting a user segmentation application, such as the content management platform 220 of FIG. 2, may be configured to perform the illustrative flow in some embodiments. Instructions for performing the operations of the illustrative flow can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figure and described herein. Each programmable module in combination with the processor represents a means for performing a respective operation(s). While the operations are illustrated in a particular order, it should be understood that no particular order is necessary and that one or more operations may be omitted, skipped, and/or reordered.

The example flow starts at operation 302, where a collection module of the computer system receives user interaction data points. In an example, the data points are received my tracking user interactions between end user computing devices and computing resources within a computer network. The tracking can be performed by the collection module or by a third party collection server and imported therefrom by the collection module.

At operation 304, a rule extractor of the computer system generates rules from the user interaction data points. In an example, a frequency-based analysis is applied to the attributes of the user interaction data points and accounts for segment indicators associated with these attributes. Hence, a rule is generated and includes a set of attributes that tend to occur together in the user interaction data points at a frequency that exceeds a threshold and that indicate that the related user interactions are associated with a segment of interest. Examples of the frequency-based analysis are further illustrated in FIG. 4.

At operation 306, a rule selector of the computer system selects a set of rules from the rules based on an objective function. In an example, the rules generated at operation 304 are used as variable inputs to the objective function. And the objective function searches for the optimal set of the rules for the segment of interest, where this set optimizes interpretability and readability parameters. Examples of defining and using the objective function are further illustrated in FIG. 4 and of increasing the computation efficiency associated with such a use are further described in FIGS. 4-10.

At operation 308, a segmentation module of the computer system segments the user interaction data points into groups of the segment of interest based on the set of rules selected at operation 306. In an example, each group is associated with one or more rules from the set. A particular rule associated with a particular group includes attributes. A user data point is added to the particular group by matching the attributes of this data point to the attributes included in the particular rule. To illustrate, the particular rule is expressed as (Chrome browser, Windows OS, and California→repeat visitors). If a user interaction data point includes these three attributes (e.g., Chrome browser, Windows OS, and California) and potentially other attributes, the interaction data point is added to the particular group. When the attributes of a user interaction data point is matched to attributes included in a rule, this matching could be referred to as the rule covering the user interaction data point. Hence, if a rule covers a user interaction data point, this data point is segmented into the group associated with the rule.

In an example, each group is associated with only one rule. In another example, each group is associated with multiple rules. In this case, a user interaction data point is added to a group in one of two possible ways. In a first way, the user interaction data point has to be covered by at least one of the rules of the group. In a second way, the user interaction data point has to be covered by a union of the rules of the group. To illustrate this second way, a group is covered by two rules. The first one is expressed as (Chrome browser, Windows OS, and California→repeat visitors). The second one is expressed as (Male Gender, Age between twenty and thirty→repeat visitors). A user interaction data point is added to the group when the attributes of this data point include the five attributes that are a union of the two rules: Chrome browser, Windows OS, California, Male Gender, and Age between twenty and thirty.

At operation 310, the segmentation module presents the groups. In example, the groups are presented on a user interface. The presentation of each group presents the rule(s) associated with the group in addition to the data points included in the group. For instance, the segmentation module provides the groups, the rules, the data points and instructions about presenting this data to a computing device of an operator hosting the user interface. Hence, the groups, the rules, and the data points are presented on the user interface according to the instructions.

At operation 312, a customization module of the computer system customizes online activity of a client based on a group that the client is associated with. In an example, a user interaction data point is received based on user interaction between an end user computing device and a computing resource (e.g., the end user computing device accessing a web site). The user interaction data point includes attributes of the user interaction (e.g., Chrome browser, Windows OS, and California) and indicates that the end user computing device is a repeat visitor (e.g., has previously accessed the web site). The attributes of this user interaction are matched to the group governed by the rule of (Chrome browser, Windows OS, and California→repeat visitors). Hence, the user interaction data point is added to the group. That group is pre-associated with targeted content. Based on the segmentation into the group, the targeted content can be provided to the end user computing device. For instance, the targeted content is provided to the end user computing device while the user interaction is ongoing (e.g., by inserting the targeted content in a space of the web site) or in a subsequent user interaction (e.g., by inserting the targeted content in the space upon a return visit or in a space of a different web site upon access thereto).

Figure 4:
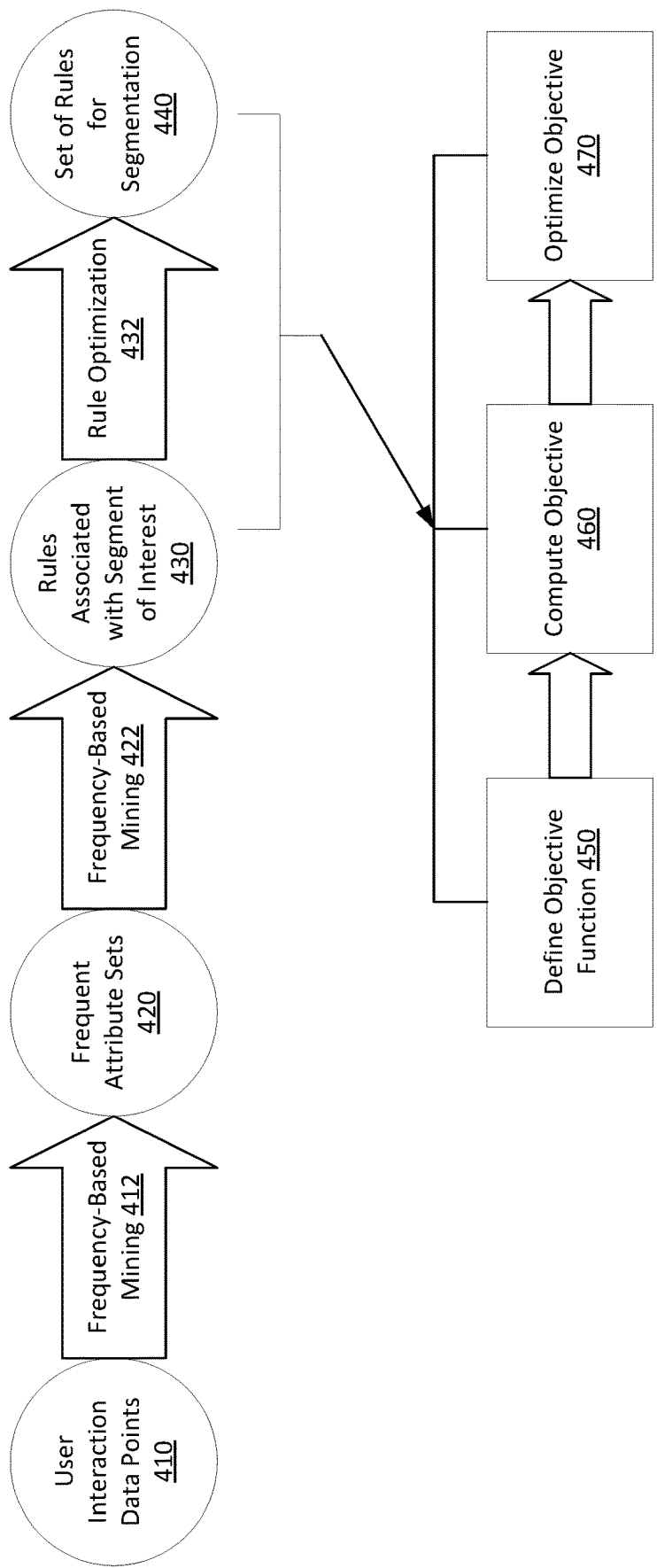
FIG. 4 is a diagram depicting an example of a flow for user segmentation according to certain embodiments.

FIG. 4 is a diagram depicting an example of a flow for user segmentation according to certain embodiments. Generally, user interaction data points 410 are analyzed to generate frequent attribute sets 420 that, in turn, are analyzed to generate rules 430 associated with a segment of interest. These rules 430 are analyzed to select a set of rules 440 (e.g., an optimal set) for use in user segmentation. Each of the analyses is explained herein next.

The user interaction data points 410 are analyzed by applying thereto frequency-based mining 412. The frequency-based mining 412 analyzes the frequency of attributes occurring together in the user interaction data points 410 (e.g., co-occurrence frequencies). Two or more attributes occurring together at a frequency that exceeds a first threshold (e.g., an average or a percentage of co-occurrence frequencies) are grouped together as a set of attributes (e.g., a frequent attribute set 420). Hence, a frequency attribute set 420 includes attributes co-occurring in the user interaction data points at a frequency that exceeds the first threshold.

The frequency attribute sets 420 are analyzed by applying thereto a different type of frequency-based mining 422. In this case, the frequency-based mining 422 also considers the segment indicators associated with the attributes. For example, the frequency-based mining 422 determines, for each frequent attribute set 420, the set of user interaction data points 410 and analyzes the data point set 410 to determine the frequency of the segment indicator of these data points indicating that the data points belong to the segment of interest. If the frequency exceeds a second threshold (e.g., an average or a percentage of such frequencies across the different frequent attribute sets 420), the frequent attribute set 420 is declared as a rule 430 associated with the segment of interest. Hence, each rule 430 includes attributes that co-occur together in the user interaction data points 410 at a frequency that exceeds the first threshold and that are found in a subset of the user interaction data points 410 with segment indicators indicating that the data points in this subset belong to the segment of interest at a frequency that exceeds the second threshold.

In an example, the two frequency-based mining 412 and 422 can be referred to as association rule mining. In the interest of clarity, various nomenclature is introduced herein for this mining and will be referred to in the description of the objective function used to select the set of rules 440 from the rules 430. Assume a binary segment indicator, where "1" indicates that a user interaction data point belongs to the segment of interest and "0" indicates otherwise. The user interaction data points 410 can be referred to as a set "D" can be organized in two subsets: "$D_1$" and "$D_0$." $D_1$ includes the user data points that have a binary indicator of "1" and $D_0$ includes the remaining user data points that have a binary indicator of "0." The frequent attribute sets 420 are generated by analyzing $D_1$ and $D_0$ and the rules 430 are generated by considering the frequent attribute sets derived from $D_1$. The rules 430 are added to a ruleset "S." The goal of the rule optimization 432 is to refine the ruleset S and get the optimal set of rules 440 (indicated as a ruleset "A") because the taking all the rules 430 will lead to a large number of groups, which can be overlapping and inaccurate.

As illustrated, the rule optimization 432 relies on an objective function for the selection of the optimal rule set A. In an example, the rule optimization 432 can be defined in three steps: defining an objective function 450, computing the objective function 460, and optimizing the objective function 470. The definition 450 of the objective function accounts for interpretability parameters and readability parameters. Its computation 460 is performed in a computationally efficient manner by taking advantage of certain definitions and using frequent pattern (FP) trees as further described in connection with the next figures. The optimization 470 represents a search for the optimal ruleset A from the original ruleset S for the segment of interest such that interpretability parameters and readability parameters are optimized.

Various interpretability parameters can be defined including the size of the optimal set A (e.g., the total number of selected rules), the length of each selected rule 440 (e.g., the total number of attributes each selected rule contains), and overlap between the selected rules 440 (e.g., the number of user interaction data points that are covered by multiple selected rules 440). Similarly, various accuracy parameters are also possible including a false positive rate (e.g., the total number of incorrect user interaction data points that would be covered by the selected rules 440) and a true positive rate (e.g., the total number of correct user interaction data points that would be covered by the selected rules 440).

In an example, the definition 450 of the objective function specifies an individual objective function for each of the interpretability parameters and readability parameters. In other words, if five total parameters as the one above are used in the definition 450, the objective function is a combination of five individual objective functions (e.g., one per parameter). Each of the individual objective functions is optimized around its respective parameter. The combination can, but need not be, linear. If a linear combination is used, the objective function is the sum of all five individual objective functions. If a non-linear combination is used, the combination is a weighted sum of the individual objective functions, where the weight changes.

For a non-linear combination, the weights can be defined based on the user input, such as the user input 130 described in connection with FIG. 1. For example, the user input can present fields associated with the parameters (e.g., a slide bar per parameter) and lets the operator set the weight given to each parameter (e.g., by sliding the bar per parameter).

The computation 460 of the objective function includes a computation of each of the individual objective functions and a computation of the combination (e.g., a sum or a weighted sum). Generally, the computation uses the rules 430 from the ruleset S as variables. For example, in one computation round, one subset of the rules 430 is used as input and the objective function is computed. At the next computation round, another subset of the rules 430 is used as input and the objective function is computed again, and so on and so forth.

The optimization 470 is this iterative search, where each iteration corresponds to a computation round, and where the search tries to find the most optimal set of the rules 430. In an example, this optimal set A is the subset of the rules 430 that increases (e.g., maximizes) the interpretability and accuracy (e.g., the input one of the computational rounds that resulted in the best score for the objective function across the different computation rounds). In an example, the interpretability is increased by selecting specific rules from the variables such that the size of the optimal set is small, the selected rules has a small length, and the overlap is reduced (e.g., minimized). The accuracy is increased by selecting specific rules from the variables such that the size of the false positive rate is decreased (e.g., minimized) and the true positive rate is increased (e.g., maximized).

The section herein next, provides an illustrative objective function and how this objective function can be computed. The section starts with defining terms used in the objective function.

Set "R" is the set of candidate rules from the ruleset "S" (e.g., R⊆S). "Size(R)" is the total size of the set R. "r" is a single rule from the set R. "Length(r)" is the length of the ruler, such as the number of attributes specified in the ruler. "Overlap($r_i$, $r_j$)" is the set of user interaction data points covered by both the rules $r_i$ and $r_j$. "Incorrect-cover(r)" is the set of points incorrectly covered by r. "Correct-cover(r)" is the set of points correctly classified by the rule r. "N" is the total number of data points in the set $D_1$. "$L_{max}$" is the maximum rule length across all rules r⌊S. "$Cover_D(r)$" is the set of the data points in the set D which satisfy the attributes used in the rule r. For example, if the rule r is expressed as (US, Chrome→1) (where "1" is the segment indicator value for the segment of interest), then $cover_D(r)$ will contain all the points which have US as the country and Chrome as the browser, irrespective of the values of the other attributes and the target variable value. "$Support_D(r)$" is the support (e.g., the size of the cover) of the ruler in the set D. "$r_i \cup r_j$" is the union of the attributes of rules $r_i$ and $r_j$. For example, union of the two attribute sets (US, Chrome) and (Chrome, Windows) will be (US, Chrome, Windows).

Relevant to the interpretability, the individual objective functions are defined as follows. A small number of rules (and, thus, a small total number of groups) is desired. The first individual objective function is defined as $f_1(R)=|S|-size(R)$. Each rule in the subset should be of a small length. Hence, the second individual objective function is defined as $f_2(R)=L_{max} \cdot |S|-\Sigma_{r \in R} length(r)$. Overlap between any pair of rules in R should also be minimized. Hence, the third individual objective function is defined as $f_3(R)=N \cdot |S|^2 - \Sigma_{r_i,r_j \in R; i \leq j} overlap(r_i, r_j)$.

Relevant to the accuracy, the individual objective functions are defined as follows. The number of incorrect points that each rule covers (e.g., the false positive rate or fallout rate) should be minimized. Hence, the fourth individual objective function is defined as $f_4(R)=N \cdot |S| \Sigma_{r \in R} |incorrect-cover(r)|$. The number of points covered by the optima rule set A (e.g., the true positive rate or recall rate) should be maximized. Hence, the fifth individual objective function is defined as $f_5(R)=N \Sigma_{x \in D_1} add-one(r|x \in correct-cover(r)\} \neq \phi)$, where a one is added for a rule r when a data point x from $D_1$ is correctly covered by the rule r.

Using the above five individual objective functions, the definition 450 of the objective function is F (R)=arg $max_{R \subseteq S} \Sigma_{i=1}^{5} \lambda_i \cdot f_i(R)$, where "$\lambda_i$" are hyperparameters which the operator can choose (e.g., defined based on the user input as illustrated in connection with FIG. 1).

The computation 460 of the objective function can be made more efficient by taking advantage of the definitions of the individual objective functions. In an example, the computations of $f_1(r)$ and $f_2(r)$ is straightforward and not much efficiency can be significantly gained. Instead, the efficiency is much increased for $f_3(r)$, $f_4(r)$, and $f_5(r)$.

Relevant to $f_3(r)$, the overlap between two rules $r_i$ and $r_j$ added to the set of rules R can be minimized by computing a size of a first set of attributes indicated as belonging to the segment of interest and a second set of attributes indicated as not belonging to the segment of interest wherein each of the first set and the second set of attributes is covered by a union of the two rules. For example, the overlap between two rules $r_i$ and $r_j$ can be calculated simply as the support of the rule formed by taking the union of both the rules, across both negative data points (e.g., belonging to $D_0$) and positive data points (e.g., belonging to $D_1$). Hence, the overlap is calculated as overlap($r_i$, $r_j$)=$support_{D_1}(r_i \cup r_j)$+$support_{D_0}(r_i \cup r_j)$.

Relevant to $f_4(r)$, the total number of user interaction data points that the set of rules incorrectly associates with the segment of interest (e.g., the fallout) can be minimized by computing a size of a set of attributes indicated as not belonging to the segment of interest and covered by at least one rule of the set of rules. For example, the incorrect cover of a rule r isincorrect–cover(r)=$support_{D_0}(r)$.

Relevant to $f_5(r)$, the total number of user interaction data points that the set of rules correctly associates with the segment of interest can be maximized by computing a size of a set of attributes indicated as belonging to the segment of interest and covered by at least one rule of the set of rules. This total number of user interaction data points is efficiently determined by maintaining a set of frequent pattern (FP) trees. For example, a first FP tree is associated with the set of rules A, and the total number of user interaction data points corresponds to a root of the first FP tree. The use of FP trees is further described in connection with FIGS. 5-7. Further, once the FP trees are defined, different techniques are possible to compute the total number of user interaction data points and optimize $f_5(r)$. These techniques include a greedy approach and an randomized approach as further described in connection with FIGS. 8-9.

By using the above computations for the overlap, incorrect cover, and correct cover, the efficiency of computing the object function F(R) is much improved. As shown in experiments, the computation can take less than fifty seconds. In comparison, existing systems would use more than 1,000 seconds to achieve similar accuracy.

Figure 5:
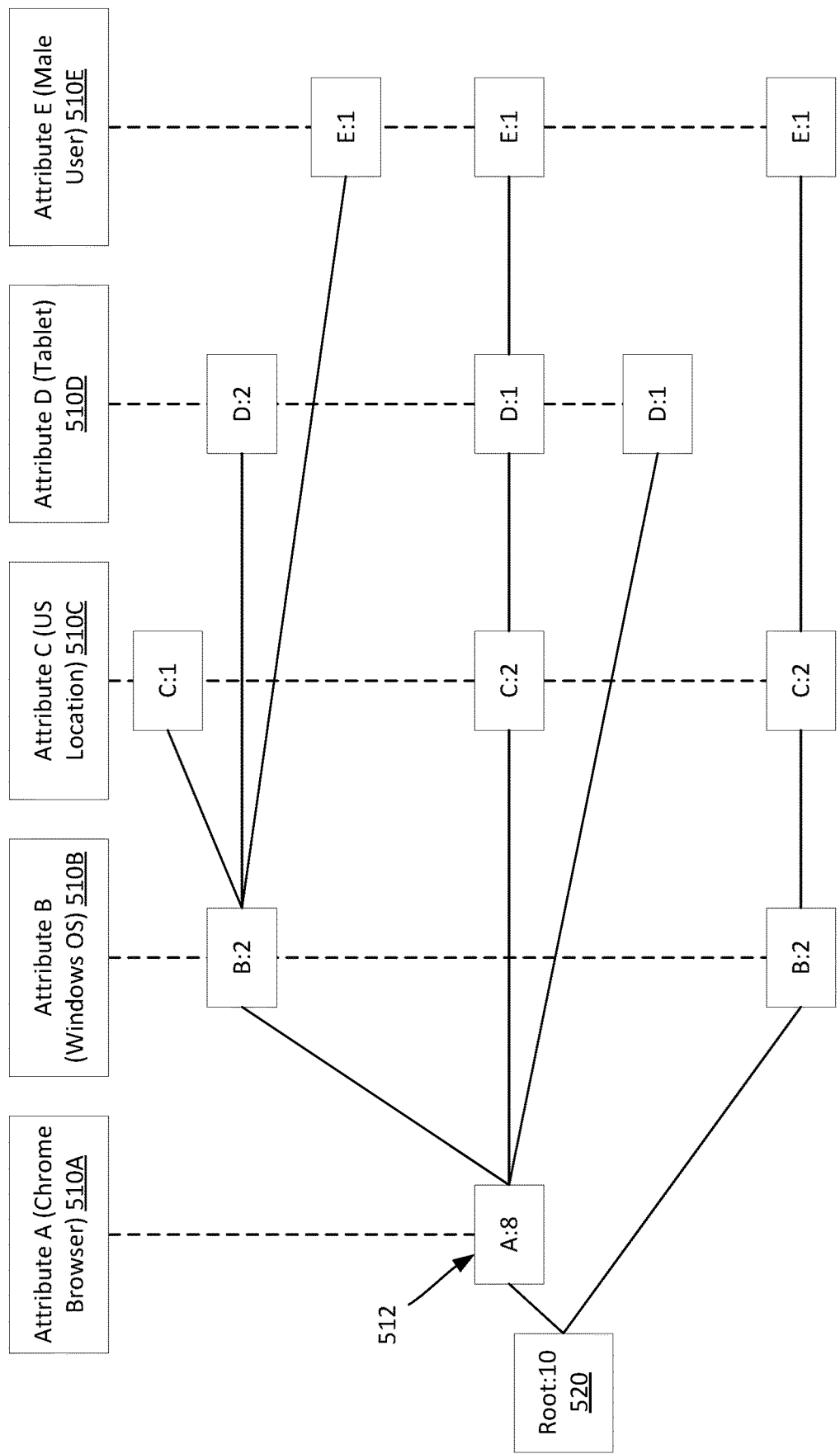
FIG. 5 illustrates an example of a frequent pattern (FP) tree according to certain embodiments.

FIG. 5 illustrates an example of a frequent pattern (FP) tree according to certain embodiments. The FP tree is generally a compressed representation of the frequent attribute sets of the user interaction data points (e.g., the frequent attribute sets 420 of FIG. 4). In other words, the FP tree is a data structure that includes information about the frequent attribute sets in a compressed manner.

The FP tree can be generated in phases. In a first phase, an FP tree algorithm counts occurrence of items (attribute-value pairs) in a dataset, and stores them to a header table. In a second phase, the FP tree algorithm generates the FP-tree structure by inserting instances. Items in each instance are typically sorted by descending order of their frequency in the dataset, so that the FP tree can be processed quickly. Items in each instance that do not meet minimum coverage thresholds are discarded. If many instances share most frequent items, the FP-tree provides high compression close to tree root.

As illustrated, the FP tree lists the attributes 510 (the most frequent ones that were not discarded) as headers (five example attributes are shown, labeled as elements 510A-510E). The FP tree also includes nodes 512. Each node corresponds to one of the attributes in the header and contains that attribute and the count (or frequency) of that attribute in the dataset. To illustrate, the attribute 510A (e.g., Chrome Browser) has a node 512 (shows as "A:8") that indicates a count of eight. Two nodes 512 are connected when they occur together in the dataset. The count of the lower node 512 (e.g., the one to right in the FP tree) is the co-occurrence frequency in the dataset. To illustrate, the node 512 of attribute 510A (e.g., Chrome Browser) is connected to a node 512 of attribute 510B (e.g., Windows OS). This latter node is to right and has a count of two, indicating that the attribute set of (Chrome Browser, Windows OS) occurs twice in the dataset. Likewise, the node 512 of attribute 510B is connected to a node 512 of attribute 510C (e.g., US location). This latter node has a count of one. This indicates that the attribute set of (Chrome Browser, Windows OS, US Location) occurs once in the dataset.

The FP tree also includes a root 520. That root 520 is to the left and is, in a way, the root node from which the other nodes 512 (e.g., the attribute nodes) grow. The counter in the root (shown in FIG. 5 as ten) is the total number of user interaction data points in the dataset.

Hence, the illustrative FP tree of FIG. 5 shows that there is a total of ten user interaction data points in the dataset. The attribute 510A (Chrome Browser) is common to eight of these ten data points. The attribute set of (Chrome Browser, Windows OS) is common to two of these ten data points. The attribute set of (Chrome Browser, Windows OS, US Location) is common to only of these ten data points. Similarly, the attribute 510B (Windows OS) is found in two of the ten data points without the attribute 510A (Chrome Browser) (by looking at the lower branch connecting the root 510 to the node 512 of the attribute 510B. The attribute set (Windows OS, US Location) is found in two of the ten data points without the attribute 510A (Chrome Browser). And so on and so forth, the FP tree can be read to derive the different occurrence frequencies of attribute sets in the dataset.

Figure 9:
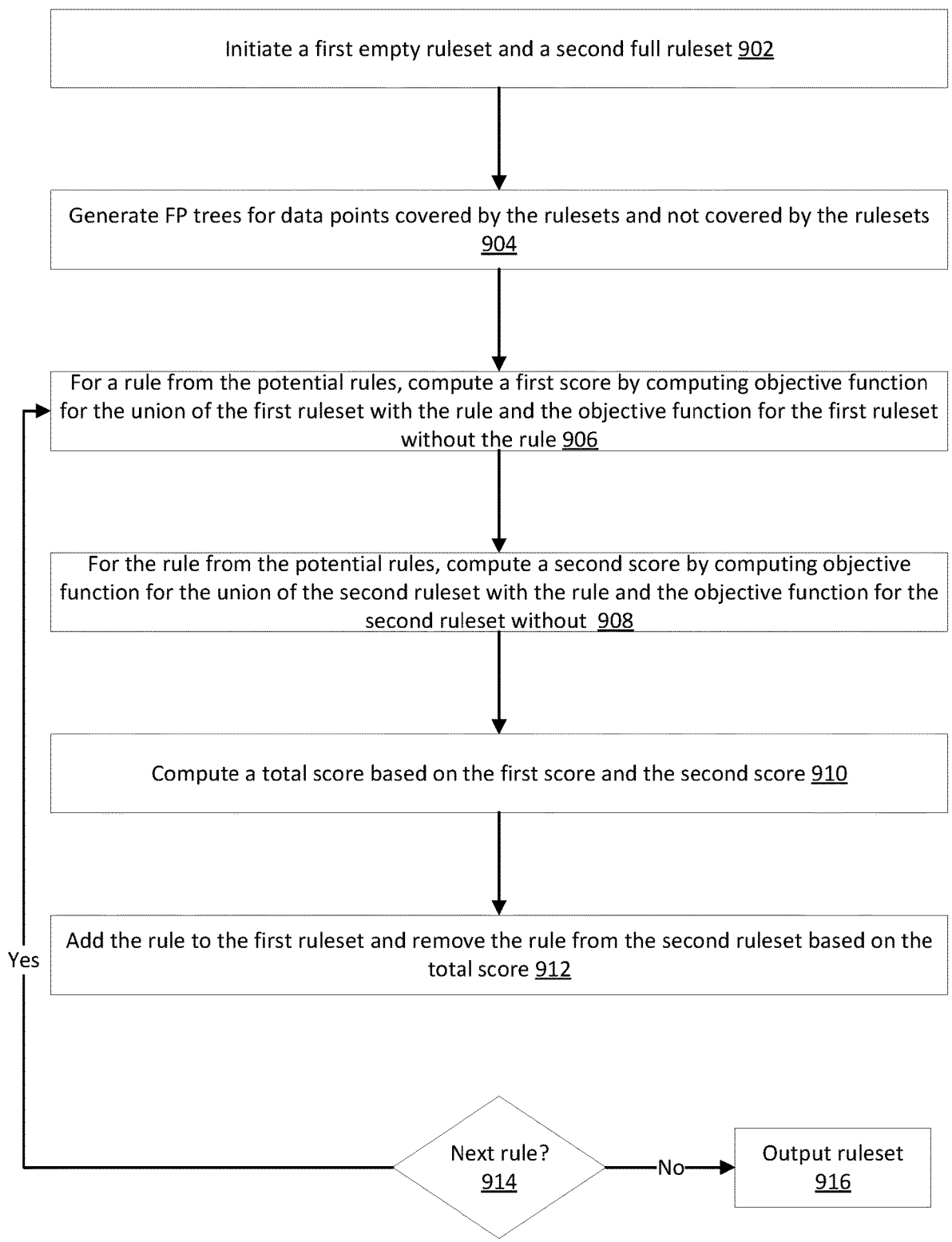
FIG. 9 illustrates an example of a flow for selecting an optimal set of rules based on an randomized approach for computing an objective function according to certain embodiments.
Figure 10:
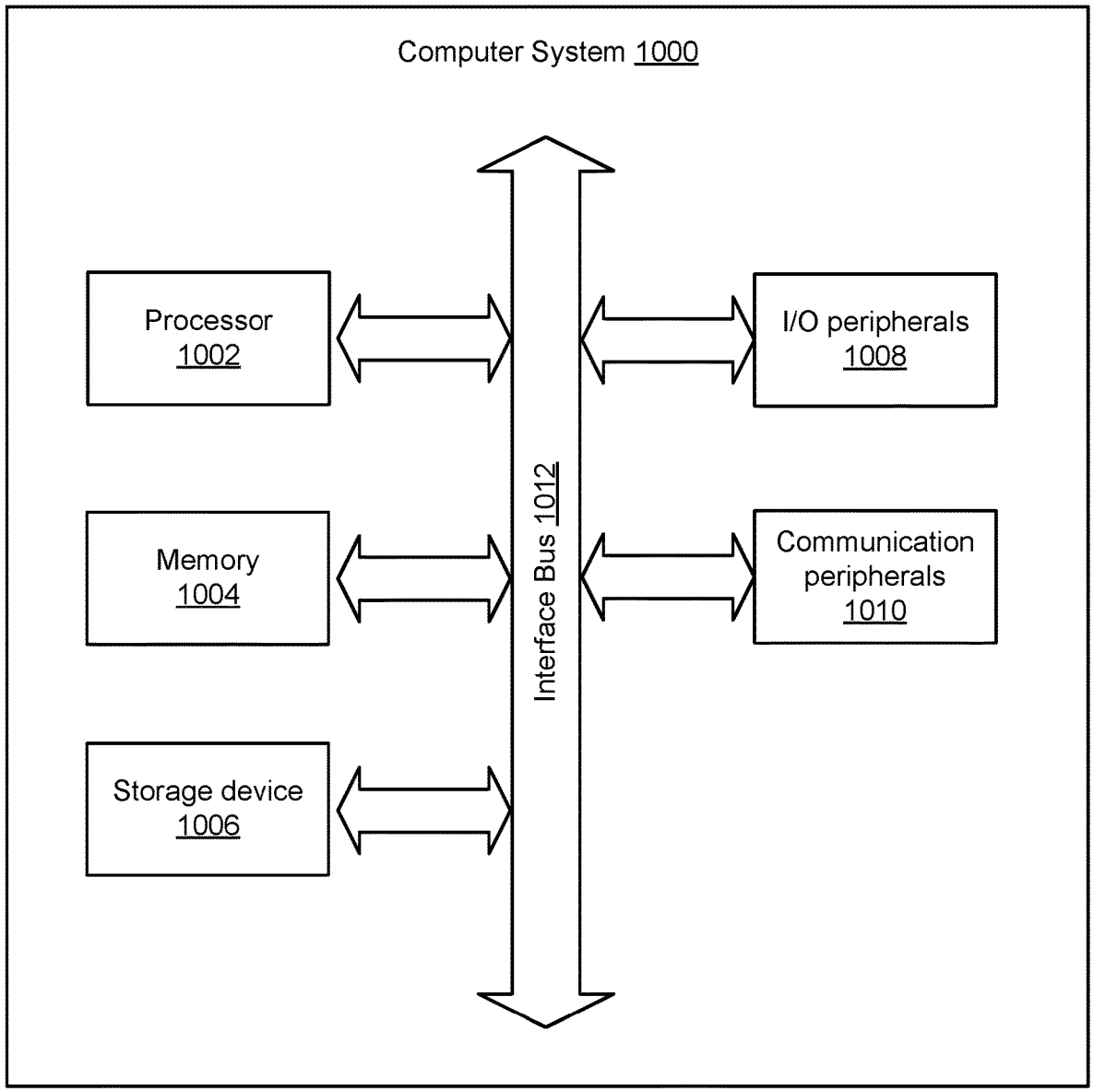
FIG. 10 illustrates examples of components of a computer system according to certain embodiments.

Such FP tree can be used to facilitate the computation of the recall (e.g., the correct-cover(r)) and, thus, to efficiently and quickly compute the individual objective function $f_5(r)$. Generally, the computation of $f_5(r)$ can follow a greedy approach (as illustrated in FIG. 9) or an randomized approach (as illustrated in FIG. 10). Under both approaches, the optimal set A of rules is determined by looking for a set R that optimizes this individual objective function (e.g., maximizes the recall). To compute the recall and perform this search, two or more FP trees (depending on the approach) can be maintained with respect to a set of rules R. One of the FP trees "$T_1$" represents the user interaction data points covered by R. Another FP tree "$T_2$" represents the user interaction data points not covered by R. The total number of user interaction data points in $T_1$ (e.g., its root) gives the recall for the set R. The search for the optimal set A (by varying the set R to search for the optimal one) adds (as in both approaches) and deletes rules (as under the randomized approach) r from R until the optimal set A is found.

To add a rule r to R and compute the recall, a search is performed for user interaction data points in $T_2$ that are covered by the rule r. These user interaction data points are deleted from $T_2$ by updating the counts in $T_2$ and are added to $T_1$. This addition process is illustrated in FIG. 6.

Figure 7:
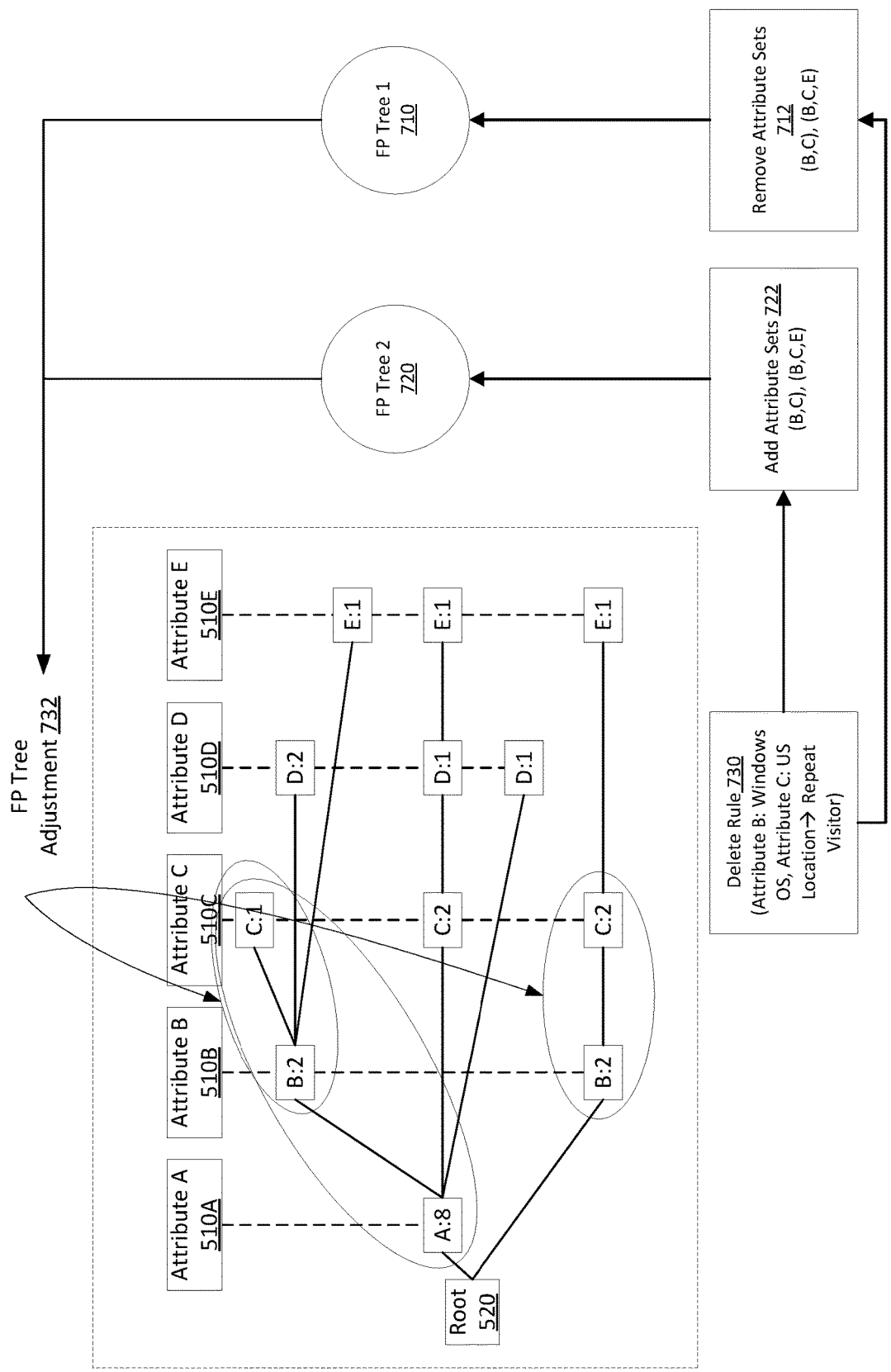
FIG. 7 illustrates an example of deleting a rule and using FP trees to update the recall according to certain embodiments.

To delete a rule r from R and compute the recall, user interaction data points from $T_1$ that are covered only by r, and no other rule in R, should be removed. Each node in an FP tree can be understood to represent the user interactions in the user interaction data points D described by the path traversed from the root to that node. To know which user interactions are covered by only r, a reference counter is maintained at each node of the FP tree, which indicates the number of rules that cover the user interactions that are specified by the attribute set that ends on this node. When a rule is deleted, the reference counters of all the nodes covered by this rule in the FP tree are reduced. Whenever a node's reference counter becomes zero, it is deleted along with its subtree. The counts in the FP tree are updated accordingly, since deletion of a node entails deletion of a number of data points, in general. This deletion process is illustrated in FIG. 7.

Figure 6:
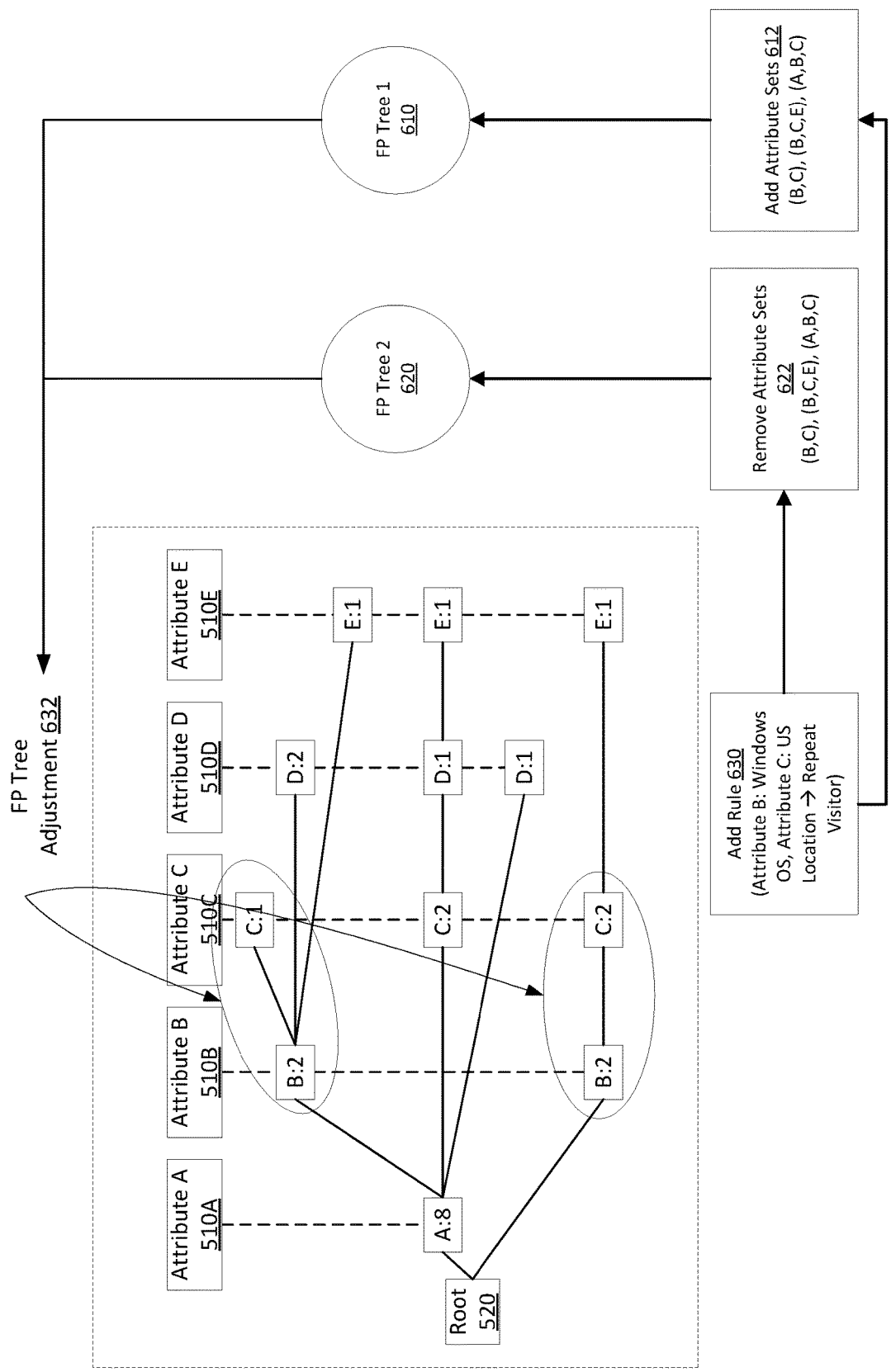
FIG. 6 illustrates an example of adding a rule and using FP trees to update the recall according to certain embodiments.

FIG. 6 illustrates an example of adding a rule and using FP trees to update the recall according to certain embodiments. The figure illustrates using FP trees $T_1$ 610 and $T_2$ 620 that have similar structures as the one of FIG. 5. Although the content is shown as the same as the one in FIG. 5 (e.g., the attributes, the counts, etc.), of course the actual content will change depending on dataset D of the user interaction data points. Here, in FIG. 6, the illustrated FP tree is $T_2$ 620 since $T_2$ 620 is considered when a rule is added.

In an example, a rule 630 is added and includes two attributes: attribute B (Windows OS) and attribute C (US location). These attributes form two attribute sets as shown in the FP tree $T_2$ 620 with the surrounding ellipses. The two attribute sets should be removed from the FP tree $T_2$ 620 such that the FP tree $T_2$ 620 becomes adjusted 632.

The FP tree $T_2$ 620 is adjusted 632 by removing attribute sets 622 that includes any sets from the FP tree $T_2$ 620 containing both attributes B and C because these two attributes are now covered by the added rule r to FP tree $T_1$ 610. Hence, the attribute sets 622 to be removed from the FP tree $T_2$ 620 are (attribute B, attribute C), (attribute B, attribute C, attribute E: male user), and (attribute A: Chrome browser, attribute B, attribute C). The removed attribute sets 622 are added to FP tree $T_1$ 610 (shown as an added attribute set 612).

Hence, the removal removes branch A-B-C and branch BC-E from the tree. The sum of the counter of utmost right nodes on the branches is the total number of user interaction data points removed from FP tree $T_2$ 620 and added to FP tree $T_1$ 610 (e.g., the updated recall). Node C is the utmost right node on the A-B-C branch. Its count is one. Node E is the utmost right node on the -B-C-E branch. Its count is two. Hence, the updated recall is three.

FIG. 7 illustrates an example of deleting a rule and using FP trees to update the recall according to certain embodiments. The figure illustrates using FP trees $T_1$ 710 and $T_2$ 720 that have similar structures as the one of FIG. 5. Although the content is shown as the same as the one in FIG. 5 (e.g., the attributes, the counts, etc.), of course the actual content will change depending on dataset D of the user interaction data points. Here, in FIG. 7, the illustrated FP tree is $T_1$ 710 since $T_1$ 710 is considered when a rule is deleted.

In an example, a rule 730 is deleted and includes two attributes: attribute B (Windows OS) and attribute C (US location). These attributes are found in two attributes sets (attribute A, attribute B, attribute C) and (attribute B, attribute C) as shown in the FP tree $T_1$ 710 with the surrounding ellipses. The two attribute sets should be removed from the FP tree $T_1$ 710 (shown as removal 712) and added to FP tree $T_2$ 720 (shown as addition 722) such that the FP tree $T_1$ 710 becomes adjusted 732.

The $T_1$ 710 is adjusted 732 by decreasing reference counters (not shown in FIG. 7) of the nodes impacted by the removal. As explained here above, the reference counter of a node keeps track of the rules added to R and that led to an increase in the data point counter of that node. When the rule 730 is deleted, the reference counters of all the nodes covered by this rule in the FP tree $T_1$ 710 are reduced (e.g., the reference counter for node A, the two nodes B, and the two nodes C as shown in FIG. 7). Whenever a node's reference counter becomes zero, the node is deleted along with its subtree.

Hence, assuming that the reference counter of the bottom node C reaches zero, that node C and the branch C-E from that node C are deleted. Because the deleted node C has a data point counter of two, that indicates that two user interaction data points are removed from FP tree $T_1$ 710 (e.g., the recall is reduced by two).

Figure 8:
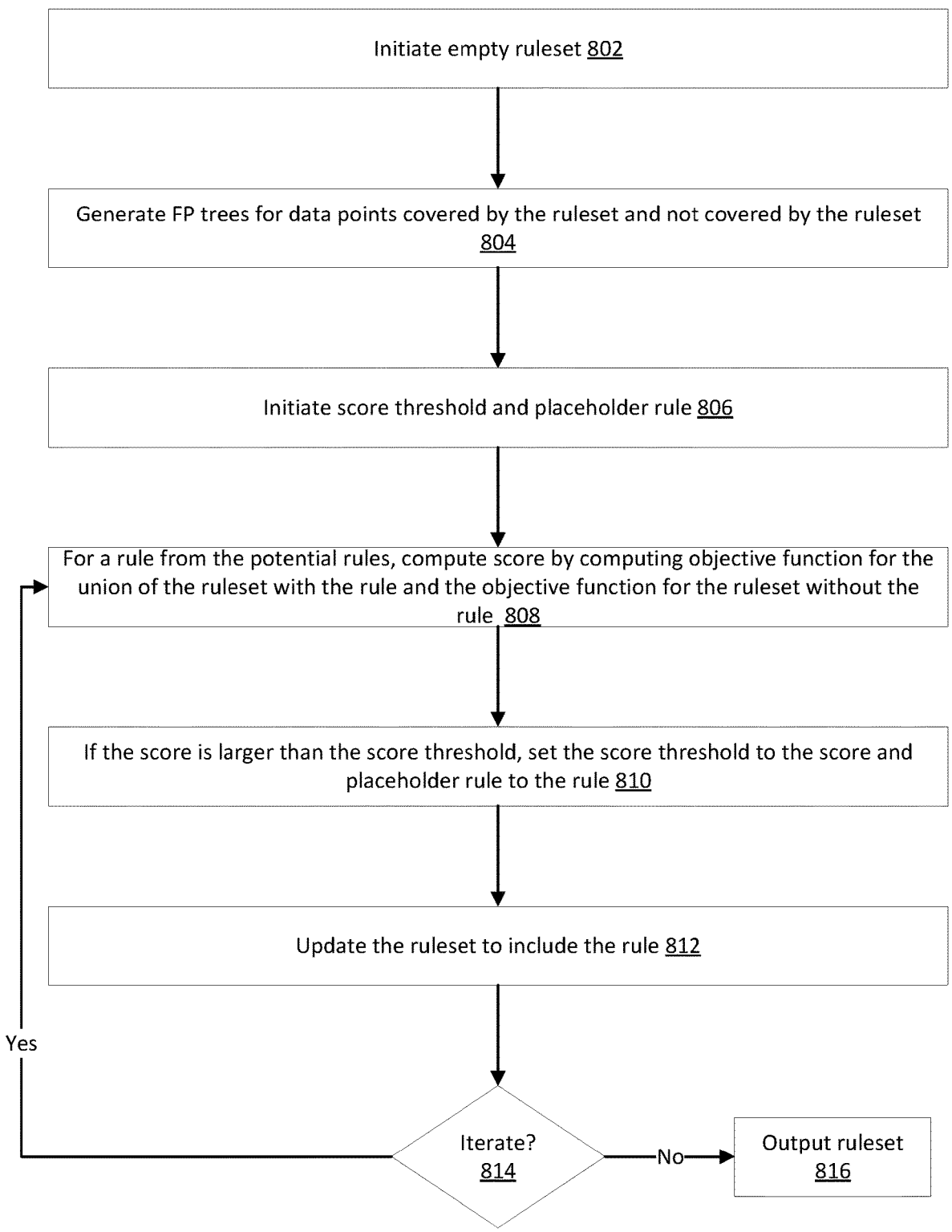
FIG. 8 illustrates an example of a flow for selecting an optimal set of rules based on a greedy approach for computing an objective function according to certain embodiments.

FIGS. 8 and 9 illustrate examples of flows for selecting an optimal set of rules based on computing an objective function. A computer system hosting a rule selector, such as the rule selector 226 of FIG. 2, may be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

In both figures, the objective function F(R) includes a combination (e.g., non-linear combination) of individual objective functions, some of which are defined to optimize interpretability parameters (e.g., the individual objective functions $f_1(r)$, $f_2(r)$, and $f_3(r)$), and remaining ones are defined to optimized accuracy parameters (e.g., the individual objective functions $f_4(r)$ and $f_5(r)$). If overlap and fallout parameters are used in the objective function F(R), its computation (e.g., of the individual objective functions $f_3(r)$ and $f_4(r)$) can be performed efficiently by computing the support as described in connection with FIG. 4. Similarly, if recall parameters are used in the objective function F(R), its computation (e.g., of the individual objective function $f_5(r)$) can be performed efficiently by using FP trees as described in connection with FIGS. 5-7.

FIG. 8 illustrates an example of a flow for selecting an optimal set of rules based on a greedy approach for computing an objective function F(R) according to certain embodiments. The example flow starts at operation 802, where the computer system initiates an empty ruleset A. Once the remaining operations of the flow are performed, rules are added to the ruleset A and this ruleset becomes the optimal set of rules to use for the user segmentation.

At operation 804, the computer system generates FP trees for user interaction data points covered by the ruleset A and not covered by the ruleset A. In an example, FP trees $T_1$ and $T_2$ are generated, similarly to the FP trees in FIGS. 6-7. The user interaction data points are for data points in the positive dataset $D_1$ (e.g., the ones indicated as belonging to a segment of interest). FP tree $T_1$ is for the user interaction data points covered by the rules r in the rulesetA. This FP tree would be initially empty since the rulesetA is initially empty too. FP tree $T_2$ is for the user interaction data points not covered by the rules r in the ruleset A. This FP tree would be initially full (e.g., for all the user interaction data points in $D_1$) since the rulesetA is initially empty. However, as rules are added to the ruleset A, the FP trees $T_1$ and $T_2$ are updated as illustrated in connection with the adding rule operation in FIG. 6.

At operation 806, the computer system initiates a score threshold and sets a placeholder rule to empty. In an example, the score threshold is a maximum score and is initiated to a negative value (e.g., a "−1") because the optimization of the objective function F(R) should be nonnegative. By using the negative value, if the computation objective function F(R) indicates a negative value, then this function has not been optimized.

At operation 808, the computer system computed, for a rule r from the potential rules in the original ruleset S, a score by computing the objective function for the union of ruleset A with the ruler (e.g., if the ruler was added to the ruleset A; e.g., F(A∪r)) and by computing the objective function for the rulesetA without the rule r (e.g., if the rule r was not added to the rulesetA; e.g., F(A)). In an example, the score is expressed as score=F(A∪r)−F(A). The rule r can be selected randomly from the original ruleset S.

At operation 810, the computer system compares the score to the score threshold. If the score is larger than the score threshold, the score threshold is updated to the computed score of operation 808, and the placeholder rule is updated to include the rule analyzed under operation 808. Otherwise, no updates are made to the score threshold or the initial rule.

At operation 812, the computer system updates the ruleset to include the rule. In an example, the computer system determines if the score threshold is greater than zero (e.g., has a positive value, which indicates that adding r to the ruleset A is better than not adding it given the subtraction operation of operation 808). If so, the placeholder rule (e.g., which contains the rule analyzed under operation 808 given the update at operation 810) is added to the ruleset A. otherwise, the ruleset A is not updated to include the rule analyzed under operation 808 (but may be updated in a subsequent iteration for a different rule).

At operation 814, the computer system determines whether it should iterate the analysis of a next rule. In an example, a predefined number of iterations is set (e.g. ten). In this example, the computer system maintains a counter of the number of iterations. As long as the counter is smaller than the predefined number, the computer system loops back to operation 808 to select another rule from the original set S and determine whether to add this rule to the ruleset A. Otherwise, the computer system performs operation 816. In another example, the number of iterations depends on the size of the ruleset A (e.g., it may be desired that the ruleset A includes five rules and, thus, the computer system keeps iterating until the fifth rule is added to the ruleset A). In this example, the computer system compares the current size of the ruleset A to the desired size, and if the current size is smaller, loops back to operation 808. Otherwise, the computer system performs operation 816.

At operation 816, the computer system outputs the ruleset A. This ruleset includes rules that are usable in the user segmentation. Hence, the example flow of FIG. 8 can be referred to as a greedy flow because it does not consider all potential rules. Instead, it builds the ruleset A with a sufficient number of rules that are interpretable and accurate. Because it does not consider all potential rules, performing this flow is computationally fast and efficient.

FIG. 9 illustrates an example of a flow for selecting an optimal set of rules based on an randomized approach for computing an objective function F(R) according to certain embodiments. Unlike the flow of FIG. 8, here the operations consider all potential rules to derive a really optimal set. Nonetheless, the computation is efficient because FP trees are used.

The example flow starts at operation 902, where the computer system initiates a first empty ruleset A and a second full ruleset (referred to herein as ruleset "B"). Hence, initially, the ruleset A is empty while the ruleset B is the same as the original ruleset S. Once the remaining operations of the flow are performed, rules are added to the ruleset A and removed from ruleset B and rulesetA becomes the optimal set of rules to use for the user segmentation.

At operation 904, the computer system generates FP trees for user interaction data points covered by the ruleset A, not covered by the ruleset A, covered by the ruleset B, and not covered by the ruleset B. In an example, four FP trees are generated. More specifically, for each of the rulesets A and B, two FP trees $T_1$ and $T_2$ are generated, similarly to the FP trees in FIGS. 6-7 (these FP trees are referred to herein as $T_{A1}$ and $T_{A2}$ for ruleset A and $T_{B1}$ and $T_{B2}$ for ruleset B). The user interaction data points are for data points in the positive dataset $D_1$ (e.g., the ones indicated as belonging to a segment of interest). FP tree $T_{A1}$ is for the user interaction data points covered by the rules r in the ruleset A. This FP tree would be initially empty since the ruleset A is initially empty too. FP tree $T_{A2}$ is for the user interaction data points not covered by the rules r in the rulesetA. This FP tree would be initially full (e.g., for all the user interaction data points in $D_1$) since the rulesetA is initially empty. Similarly, FP tree $T_{B1}$ is for the user interaction data points covered by the rules r in the ruleset B. This FP tree would be initially full since the ruleset B is initially the originally ruleset S. FP tree $T_{B2}$ is for the user interaction data points not covered by the rules r in the ruleset B. This FP tree would be initially empty. However, as rules are added to the ruleset A and removed from ruleset B, the FP trees $T_{A1}$, $T_{A2}$, $T_{B1}$, $T_{B2}$ are updated as illustrated in connection with the adding rule operation in FIG. 6 and removing rule operation in FIG. 7.

At operation 906, the computer system computes a first score (which is referred to herein as score "a") for a rule to be added to the ruleset A from the ruleset B. The first score is associated with the impact of adding this rule to the ruleset A. In an example, the first score is computed by computing the objective function for the union of ruleset A with the rule r (e.g., if the rule r was added to the ruleset A—F(A∪r)) and by computing the objective function for the ruleset A without the ruler (e.g., if the ruler was not added to the ruleset A—F(A)). In an example, the score a is expressed as score a=F(A∪r)−F(A).

At operation 908, the computer system computes a second score (which is referred to herein as score "b") for the rule. The second score is associated with the impact of removing this rule from the ruleset B. In an example, the second score is computed by computing the objective function for the ruleset B without the ruler (e.g., if the ruler was removed from the ruleset B; e.g., F(B\r)) and by computing the objective function for the ruleset B with the rule r (e.g., if the rule r remained in the ruleset B; e.g., F(B)). In an example, the score b is expressed as score b=F(B\r)−F(B).

At operation 910, the computer system computes a total score based on the two scores. In an example, the first score a is set to a maximum value of the score a as computed under operation 906 and zero (e.g., score a=max(score a, 0). Likewise, the second score b is set to a maximum value of the score b as computed under operation 908 and zero (e.g., score b=max(score b, 0). In this way, negative values of the two scores are eliminated. The total score is initially set as a value between zero and one using a uniform distribution (e.g., total score=unif(0,1). If the total score is smaller than a normalized value of the two scores $$\left(\text{e.g., total score} < \frac{\text{score } a}{\text{score } a + \text{score } b}\right),$$

the rule r should be added to the ruleset A and removed from the ruleset B. Otherwise or if both scores a and b are zero, the rule r should not be added to the ruleset A and should stay in the ruleset B.

At operation 912, the computer system updates the rulesets A and B based on the total score. As explained above, If the total score is smaller than the normalized value of the two scores, the computer system adds the rule r to the ruleset A and removes it from the ruleset B. otherwise or if both scores a and b are zero, the computer system does not add the rule to the ruleset A and keeps it in the ruleset B instead.

At operation 914, the computer system determines whether it should iterate the analysis of a next rule. In an example, the computer system iterates through all the rules in original ruleset S (or, equivalently, the second ruleset B). If a rule has not been analyzed yet, the computer system loops back to operation 906 to select this rule S and determine whether to add it to the ruleset A and remove it from the ruleset B. Otherwise, the computer system performs operation 916.

At operation 916, the computer system outputs the ruleset A. This ruleset includes rules that are usable in the user segmentation. Hence, the example flow of FIG. 9 can be referred to as an optimal flow because it does not consider all potential rules.

In experiments, user segmentation using either the greedy or randomized approach proved to have a superior performance than that of existing systems. In the experiments, user interaction data was collected for six million sessions across 3.6 million unique visitors of web sites. The attributes included demographic attributes (city, region, country, time zone), device attributes (device type, device brand, OS, display resolution, browser, Java enabled or not in browser, JavaScript version), visitor related attributes, and session specific attributes (e.g., session length). Three existing system models were used, in addition to the greedy and randomized approaches. These three existing models were a decision tree. A factorization machine based neural network (FNN), and a logistic regression. Performance metrics were measured. The results of the experiments are presented in the next table.

| Performance metric | Decision Tree | FNN | Logistic Regression | Randomized approach | Greedy Approach |
|---|---|---|---|---|---|
| Precision | 0.8 | 0.79 | 0.77 | 0.77 | 0.81 |
| Recall | 0.89 | 0.94 | 0.92 | 0.9 | 0.83 |
| Interpretability | Moderate | Absent | Absent | High | High |
| Running Time (sec) | 210 | >1,000 | >1,000 | 43 | 37 |

As shown in the table, the precision and recall (e.g., the accuracy) of the greedy and randomized approaches are very comparable to the most accurate existing systems. However, the interpretability and running time of the running times of the greedy and randomized approaches are much more superior. The running time FNN and Logistic Regression are quite high, essentially because of the various cross-interaction terms captured in these models. Moreover, these models do not output any interpretable segments, making them unsuitable for our task.

When comparing the randomized approach with the decision tree, the precision and recall are comparable. However, randomized approach has a much lower run-time than the decision tree. Similarly, the memory consumption of the decision tree is extremely high. In fact, to run the decision tree, the size of the dataset had to be reduced in the experiments from six million data points to around 1.6 million data points, to make sure that the program ran in the available memory (on a 16 GB memory machine). Moreover, the rules generated by the decision tree can have predicates with a "not-equal to" qualifier. For an operator, this leads to some loss in interpretability, since typically operators expect highly targeted segments.

FIG. 10 illustrates examples of components of a computer system 1000 according to certain embodiments. The computer system 1000 includes at least a processor 1002, a memory 1004, a storage device 1006, input/output peripherals (I/O) 1008, communication peripherals 1010, and an interface bus 1012. The interface bus 1012 is configured to communicate, transmit, and transfer data, controls, and commands among the various components of the computer system 1000. The memory 1004 and the storage device 1006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1004 and the storage device 1006 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computing systems of, for example, a cloud network or a data center. The I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1008 are connected to the processor 1002 through any of the ports coupled to the interface bus 1012. The communication peripherals 1010 are configured to facilitate communication between the computer system 1000 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for presenting rules used by a classifier in connection with user segmentation, the computer-implemented method comprising;
   receiving, by a computer system, user interaction data points, wherein each user interaction data point comprises at least one attribute of a user interaction within a computer network and a segment indicator of whether the user interaction belongs to a segment of interest;
   generating, by the computer system, rules based on frequencies of occurrence of attributes of user interactions in the user interaction data points and based on segment indicators associated with the user interactions, wherein each rule comprises a different set of the attributes and indicates that the different set of the attributes is associated with the segment of interest;
   maintaining a set of frequent pattern (FP) trees associated with the rules;
   constructing an objective function comprising a combination of individual objective functions, wherein the individual objective functions include an accuracy objective function for optimizing an accuracy parameter,
   wherein the accuracy parameter is a total number of user interaction data points that the rules correctly associate with the segment of interest, and wherein the accuracy parameter is determined from a root of an FP tree in the set of FP trees associated with the rules;
   selecting, by the computer system, a set of rules from the rules based on an the objective function, wherein selecting the set of rules comprises using the rules as variables of the objective function and optimizing the objective function for the segment of interest based on interpretability parameters and accuracy parameters;
   segmenting, by the computer system, the user interaction data points into groups of the segment of interest based on the set of rules, wherein each group is associated with a rule from the set of rules, and wherein a user interaction data point comprising a set of attributes is added to a group based on a match between the set of attributes and the rule associated with the group; and
   presenting, by the computer system on a user interface, the groups, wherein a presentation of each group presents the rule associated with the group.

2. The computer-implemented method of claim 1, wherein the objective function comprises a combination of individual objective functions, wherein a set of the individual objective functions are associated with the interpretability parameters and a remaining set of individual objective functions are associated with the accuracy parameters.

3. The computer-implemented method of claim 2, wherein the combination is a non-linear combination that weighs the individual objective functions based on user input received on the user interface, wherein the user input specifies one or more of: a total number of the rules, a maximum number of attributes that each rule should include, a precision associated with the segmenting, or a recall associated with the segmenting.

4. The computer-implemented method of claim 1, wherein the objective function comprises a combination of individual objective functions, wherein an individual objective function of the individual objective functions optimizes an interpretability parameter by minimizing a size of the set of rules.

5. The computer-implemented method of claim 1, wherein the objective function comprises a combination of individual objective functions, wherein an individual objective function of the individual objective functions optimizes an interpretability parameter by favoring a selection of a first rule comprising a first set of the attributes over a second rule comprising a second set of the attributes for addition to the set of rules based on a size of the first set of the attributes being smaller than a size of the second set of the attributes.

6. The computer-implemented method of claim 1, wherein the objective function comprises a combination of individual objective functions, wherein an individual objective function of the individual objective functions optimizes an interpretability parameter by minimizing an overlap between two rules added to the set of rules.

7. The computer-implemented method of claim 6, wherein the overlap between the two rules is determined by computing a size of a first set of attributes indicated as belonging to the segment of interest and a second set of attributes indicated as not belonging to the segment of interest, wherein each of the first set and the second set is covered by a union of the two rules.

8. The computer-implemented method of claim 1, wherein the objective function comprises a combination of individual objective functions, wherein an individual objective function of the individual objective functions optimizes an accuracy parameter by minimizing a total number of user interaction data points that the set of rules incorrectly associates with the segment of interest.

9. The computer-implemented method of claim 8, wherein the total number of user interaction data points is determined by computing a size of a set of attributes indicated as not belonging to the segment of interest and covered by at least one rule of the set of rules.

10. The computer-implemented method of claim 1, wherein the accuracy objective function of the individual objective functions optimizes the accuracy parameter by maximizing the total number of user interaction data points that the set of rules correctly associates with the segment of interest.

11. The computer-implemented method of claim 10, wherein the total number of user interaction data points is a size of a set of attributes belonging to the segment of interest and covered by at least one rule of the set of rules.

12. The computer-implemented method of claim 11, wherein the set of FP trees comprises a second FP tree associated with a complement set of rules from the rules, and wherein the total number of user interaction data points is determined from the root of the FP tree based on updating the first FP tree and second FP tree upon an addition of a rule from the complement set of rules to the set of rules.

13. The computer-implemented method of claim 12, wherein the total number of user interaction data points is further determined from the root of the FP tree based on updating the FP tree and second FP tree upon a removal of another rule from the set of rules to the complement set of rules.

14. The computer-implemented method of claim 11, wherein the accuracy objective function is optimized based on computing a first score for the set of rules excluding a particular rule and on a second score for the set of rules including the particular rule, and wherein the first score and the second score are computed based on adjustments to the set of FP trees.

15. The computer-implemented method of claim 11, wherein the accuracy objective function is optimized based on computing a first score for the set of rules excluding a particular rule, on a second score for the set of rules including the particular rule, on a third score for a complement set of rules including the particular rule, and on a fourth score for the complement set of rules excluding the particular rule, and wherein the first score, the second score, the third score, and the fourth score are computed based on adjustments to the set of FP trees associated with adding to the set of rules and removing the particular rule from the complement set of rules.

16. A computer system comprising:
means for receiving user interaction data points, wherein each user interaction data point comprises at least one attribute of a user interaction within a computer network and a segment indicator or whether the user interaction belongs to a segment of interest;
means for generating rules based on frequencies of occurrence of attributes of user interactions in the user interaction data points and based on segment indicators associated with the user interactions, wherein each rule comprises a different set of the attributes and indicates that the different set of the attributes is associated with the segment of interest;
means for maintaining a set of frequent pattern (FP) trees associated with the rules;
means for constructing an objective function comprising a combination of individual objective functions, wherein the individual objective functions include an accuracy objective function for optimizing an accuracy parameter,
wherein the accuracy parameter is a total number of user interaction data points that the rules correctly associate with the segment of interest, and wherein the accuracy parameter is determined from a root of an FP tree in the set of FP trees associated with the rules;
means for selecting a set of rules from the rules based on an objective function, wherein selecting the set of rules comprises using the rules as variables of the objective function and optimizing the objective function for the segment of interest based on interpretability parameters and accuracy parameters;
means for segmenting the user interaction data points into groups of the segment of interest based on the set of rules, wherein each group is associated with a rule from the set of rules, and wherein a user interaction data point comprising a set of attributes is added to a group based on a match between the set of attributes and the rule associated with the group; and
means for presenting, on a user interface, the groups, wherein a presentation of each group presents the rule associated with the group.

17. The computer system of claim 16, wherein the groups are used as controls of a content management system, wherein the content management system automatically transmits targeted content to a user device based on segmenting a user interaction data point provided from the user device in a particular group of the groups.

18. A non-transitory computer-readable storage medium storing instructions that, upon execution on a computer system, cause the computer system to perform operations comprising:
receiving user interaction data points, wherein each user interaction data point comprises at least one attribute of a user interaction within a computer network and a segment indicator of whether the user interaction belongs to a segment of interest;
generating rules based on frequencies of occurrence of attributes of user interactions in the user interaction data points and based on segment indicators associated with the user interactions, wherein each rule comprises a different set of the attributes and indicates that the different set of the attributes is associated with the segment of interest;
maintaining a set of frequent pattern (FP) trees associated with the rules;
constructing an objective function comprising a combination of individual objective functions, wherein the individual objective functions include an accuracy objective function for optimizing an accuracy parameter,
wherein the accuracy parameter is a total number of user interaction data points that the rules correctly associate with the segment of interest, and wherein the accuracy parameter is determined from a root of an FP tree in the set of FP trees associated with the rules;
selecting a set of rules from the rules based on an objective function, wherein selecting the set of rules comprises using the rules as variables of the objective function and optimizing the objective function for the segment of interest based on interpretability parameters and accuracy parameters;
segmenting the user interaction data points into groups of the segment of interest based on the set of rules, wherein each group is associated with a rule from the set of rules, and wherein a user interaction data point comprising a set of attributes is added to a group based on a match between the set of attributes and the rule associated with the group; and
presenting, on a user interface, the groups, wherein a presentation of each group presents the rule associated with the group.

19. The non-transitory computer-readable storage medium of claim 18, wherein the objective function comprises a non-linear combination of the individual objective functions, wherein a set of the individual objective functions are associated with the interpretability parameters and a remaining set of individual objective functions are associated with the accuracy parameters, and wherein the individual objective functions are weighted based on user input received on the user interface.

\* \* \* \* \*